US012602980B1

(12) United States Patent
Ali et al.

(10) Patent No.: US 12,602,980 B1
(45) Date of Patent: Apr. 14, 2026

(54) SYSTEM AND METHOD FOR CHILD MONITORING AND RISK MANAGEMENT

(71) Applicant: IMAM MOHAMMAD IBN SAUD ISLAMIC UNIVERSITY, Riyadh (SA)

(72) Inventors: Shehzad Ali, Seoul (KR); Md Tanvir Islam, Seoul (KR); Ik Hyun Lee, Seoul (KR); Abdul Khader Jilani Saudagar, Riyadh (SA); Abdullah M. Albarrak, Riyadh (SA); Khan Muhammad, Seoul (KR)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/263,781

(22) Filed: Jul. 9, 2025

(51) Int. Cl.
G08B 21/02 (2006.01)
G06V 20/40 (2022.01)
G06V 20/52 (2022.01)
G06V 40/10 (2022.01)

(52) U.S. Cl.
CPC ......... G08B 21/0208 (2013.01); G06V 20/40 (2022.01); G06V 20/52 (2022.01); G06V 40/10 (2022.01); G08B 21/0283 (2013.01)

(58) Field of Classification Search
CPC ............ G08B 21/0208; G08B 21/0283; G06V 20/40; G06V 20/52; G06V 40/10
See application file for complete search history.

(56) References Cited

U.S. PATENT DOCUMENTS

2023/0108654 A1* 4/2023 McRae .................. G06V 20/44
                                                340/506
2023/0252873 A1* 8/2023 Wang ....................... G08B 3/10
                                                340/573.4
2024/0054788 A1* 2/2024 Renduchintala ....... G06V 20/52

FOREIGN PATENT DOCUMENTS

CN        111460978 A      7/2020
CN        118076292 A      5/2024
IN     202441042957 A      6/2024

OTHER PUBLICATIONS

Rahul Mishra, et al., "i-Care: A Multi-Modal Data Integration Approach for Real-Time Surveillance and Voice Assistance to Improve Infant Care", in the 11th ACM International Conference on Systems for Energy-Efficient Buildings, Cities, and Transportation (BuildSys '24), Nov. 7-8, 2024, pp. 99-109.

* cited by examiner

*Primary Examiner* — An T Nguyen
(74) *Attorney, Agent, or Firm* — Oblon, McClelland, Maier & Neustadt, L.L.P.

(57) ABSTRACT

A child monitoring system that includes processing circuitry that receives image data and detects a presence of a child in the image data using a child detection module. After detecting the presence of the child, the processing circuitry determines, using an activity prediction module, an activity the child is engaged in based on the image data. The processing circuitry further extracts, using an environmental extraction module, context information related to an environment where the child is engaging in the activity based on the image data and determines, using a large language model, a risk based on the activity the child is engaged in and the context information. The processing circuitry further generates a caretaker alert based on the risk and transmits the caretaker alert to a caretaker device.

20 Claims, 10 Drawing Sheets

600

SYSTEM AND METHOD FOR CHILD MONITORING AND RISK MANAGEMENT

BACKGROUND

Technical Field

The present disclosure is directed to a system and method for monitoring and assessing activities of children to ensure safety, including hazard detection, risk assessment, and real-time alerting.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Child safety is a growing concern in modern households, schools, and public spaces. Young children are naturally curious and prone to engaging in potentially hazardous activities, such as climbing furniture, running near sharp objects, or playing with electrical appliances. Traditionally, childproofing measures such as installing safety gates, securing furniture, and using baby monitors have been employed to mitigate risks. However, these measures primarily focus on physical barriers and passive monitoring rather than proactively anticipating dangers before they occur.

Conventionally, various methods have been proposed to improve child safety through image/video processing and sensor-based systems. For instance, in one conventional approach, child safety has been ensured through physical safety measures such as childproof locks, safety gates, socket covers, and furniture restraints [B. Suthar and B. Gadhiya, Child Activity Recognition using Deep Learning, International Journal of Engineering and Advanced Technology, 2020, 9, 5, 364-367]. While these solutions provide foundational safety, they do not adapt to the changing behavior of a child or the evolving dynamics of an environment and are incapable of anticipating potential dangers.

In another conventional approach, real-time monitoring systems like baby monitors and surveillance cameras provide live audio and video feeds, enabling caretakers to observe the child remotely. However, these systems require continuous attention and manual intervention, which may not always be feasible and cannot differentiate between safe and hazardous activities. Similarly, motion detection systems integrated into smart home security setups lack the ability to determine whether a movement detected is hazardous and often result in false alarms.

Other conventional techniques, such as a video-based child safety assessment using machine learning, process video streams to classify child activities as safe or unsafe [N. Ahmad, S. Arya, and D. Singh, Predicting risky environment for child inside house using deep learning, 2023 International Conference on Emerging Smart Computing and Informatics (ESCI), Pune, India, 2023, pp. 1-6]. However, they fail to assess the severity of potentially hazardous actions, lack a comprehensive risk evaluation framework, and do not provide real-time alerts. Another conventional technique uses closed-circuit television (CCTV) data to detect hazards associated with sharp objects relies on predefined thresholds to determine safety levels [J. H. Tan and C. P. Goh, Enhancing Child Safety: Computer Vision-Based Accident Detection for Infants and Toddlers, 2024 3rd International Conference on Digital Transformation and Applications (ICDXA), Kuala Lumpur, Malaysia, 2024, pp. 1-5]. While the conventional technique is effective for certain hazards, it does not account for a broader range of dangers or adapt over time, limiting its overall effectiveness.

Thus, there is a need for intelligent and proactive child safety solutions that can anticipate hazardous activities and provide timely, accurate alerts to the caretakers and interventions to the child.

SUMMARY

According to a first aspect, the present disclosure relates to a child monitoring system. In some embodiments, the system includes processing circuitry configured to receive image data. In some embodiments, the processing circuitry is further configured to detect, in the image data, a presence of a child using a child detection module. In some embodiments, the processing circuitry is further configured to determine, using an activity prediction module, an activity the child is engaged in based on the image data, after detecting the presence of the child. In some embodiments, the processing circuitry is further configured to extracting, using an environmental extraction module, context information related to an environment where the child is engaging in the activity based on the image data, after the determining the activity the child is engaged in. In some embodiments, the processing circuitry is further configured to determining, using a large language model, a risk based on the activity the child is engaged in and the context information, after the extracting the context information. In some embodiments, the processing circuitry is further configured to generating a caretaker alert based on the risk. In some embodiments, the processing circuitry is further configured to transmitting the caretaker alert to a caretaker device.

The present disclosure also relates to a method for child monitoring. In some embodiments, the method includes receiving image data. In some embodiments, the method further includes detecting, in the image data, a presence of a child using a child detection module. In some embodiments, the method further includes after detecting the presence of the child, determining, using an activity prediction module, an activity the child is engaged in based on the image data. In some embodiments, the method includes, after determining the activity the child is engaged in, extracting, using an environmental extraction module, context information related to an environment where the child is engaging in the activity based on the image data. In some embodiments, the method further includes, after extracting the context information, determining, using a large language model, a risk based on the activity the child is engaged in and the context information. In some embodiments, the method further includes based on the risk, generating a caretaker alert. In some embodiments, the method further includes transmitting the caretaker alert to a caretaker device.

The present disclosure also relates to a non-transitory computer-readable medium having stored thereon, computer executable instructions, which when executed by a computer, cause the computer to execute operations. In some embodiments, the operations include receiving image data. In some embodiments, the operations further include detecting, in the image data, a presence of a child using a child detection module. In some embodiments, the operations further include after detecting the presence of the child, determining, using an activity prediction module, an activity the child is engaged in based on the image data. In some embodiments, the operations further include after the determining the activity the child is engaged in, extracting, using an environmental extraction module, context information related to an environment where the child is engaging in the activity based on the image data. In some embodiments, the operations further include after the extracting the context information, determining, using a large language model, a risk based on the activity the child is engaged in and the context information. In some embodiments, the operations further include based on the risk, generating a caretaker alert. In some embodiments, the operations further include transmitting the caretaker alert to a caretaker device.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
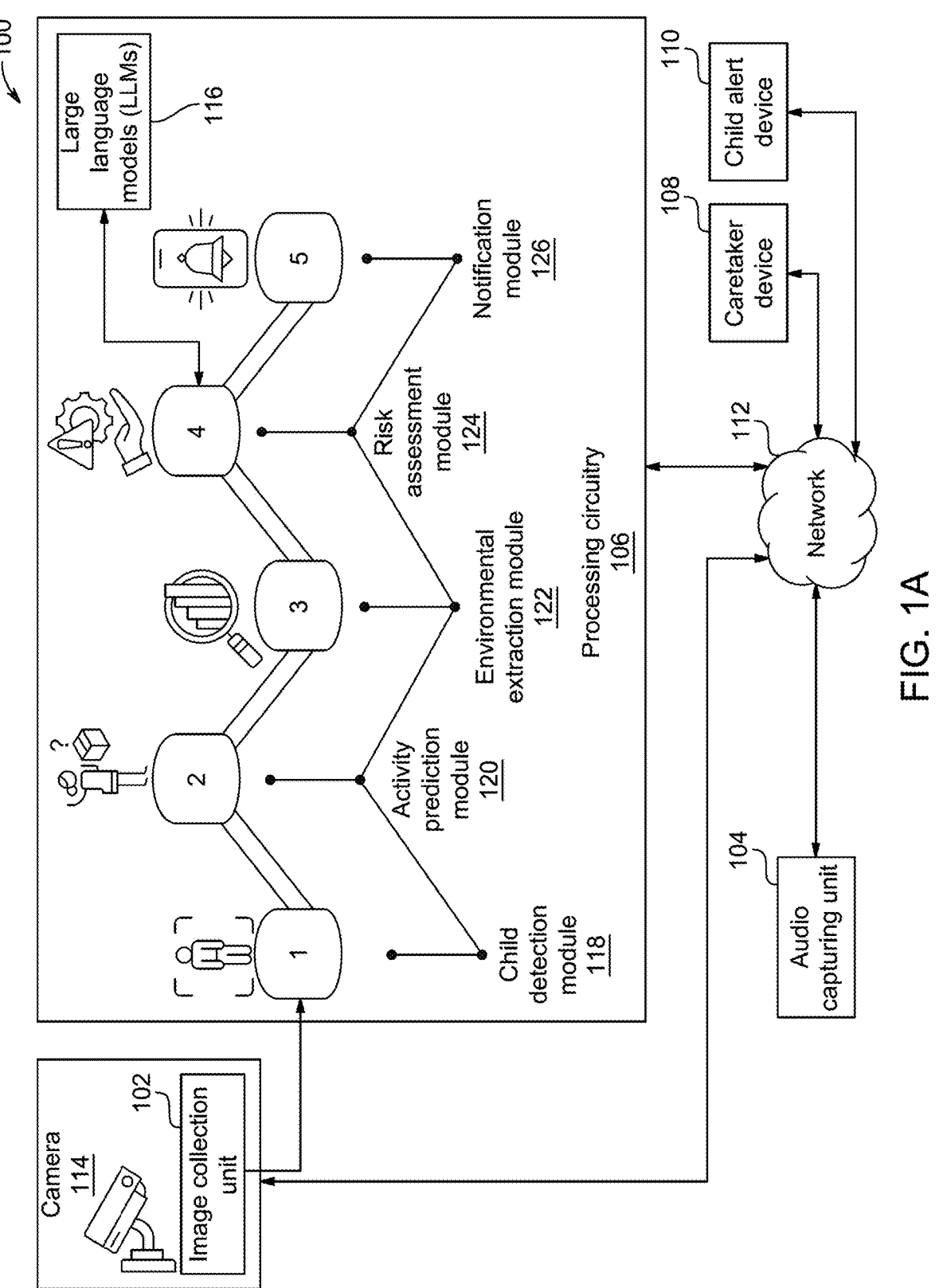
FIG. 1A illustrates a workflow of a child monitoring system, according to certain embodiments.

In the drawings, like reference numerals designate identical or corresponding parts throughout the several views. As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

According to a first aspect, the present disclosure is related to a system for child hazard activity anticipation and risk assessment. In some embodiments, the system uses deep learning techniques, computer vision, and large language models (LLMs) to provide a predictive approach to child safety. Conventional child safety systems often rely on purely reactive measures, such as monitoring devices or predefined alerts, which can only respond in very limited ways to hazardous events once they have already occurred. These conventional systems lack the ability to anticipate and assess potential risks before they become critical, limiting their effectiveness in preventing accidents. Further, conventional systems rely on simplistic hazard detection. However, actions and situations may be safe and normal in one context while they are dangerous in another context. The system of the present disclosure can account for the contextual differences in activities to assess the risks to reduce false positives for safe activities and reduce false negatives for dangerous activities. For example, a child jumping could be a safe activity is performed on the ground but a dangerous activity if the child is jumping on an elevated platform such as a couch or bed. That elevation can change the same motion of the child (jumping) from a non-hazardous activity that is considered normal to an abnormal and hazardous activity. A conventional system could only detect "child jumping" and would always alert the parent or caretaker. This would mean that the parent or caretaker would have to endure numerous alerts related to a child jumping on the ground, a safe and normal activity for a child or have to disable alerts for jumping and forego alerts related to a child jumping on the bed, a hazardous activity.

In some embodiments, the present disclosure combines computer vision and LLMs to analyze a child's environment and assess the risk of hazardous events in real time. The computer vision processes visual data to detect potential hazards, while the LLMs offer contextual understanding and risk evaluation. Consequently, the disclosure anticipates hazardous behaviors of the child and prompts for preventive actions before the accidents happen. Unlike conventional reactive systems that only respond after a hazard occurs, the present disclosure proactively anticipates dangers and alerts caretakers in advance to potential risks while avoiding over-alerting for generally safe activities.

FIG. 1A illustrates an exemplary workflow of a child monitoring system 100 (hereinafter referred to as the system 100), according to certain embodiments. In some embodiments, the system 100 is configured to anticipate and assess child's hazardous activities (e.g., climbing on furniture, jumping on sofas, playing near staircases, and so forth) involving a child by utilizing technologies, such as but not limited to, machine learning (ML) models, deep learning models, a computer vision technique, large language models (LLMs), and the like. Embodiments of the present disclosure are intended to include or otherwise cover any type of advanced technologies, including known related art and/or later developed technologies. In some embodiments, the system 100 is configured to predict potential risks in real-time and provide proactive notifications to caretakers, enabling timely interventions to prevent accidents or injuries.

In some embodiments, the system 100 includes an image collection unit 102, an audio capturing unit 104, a processing circuitry 106, a caretaker device 108 and a child alert device 110. In some embodiments, the image collection unit 102, the audio capturing unit 104, the processing circuitry 106, the caretaker device 108 and the child alert device 110 may be connected to each other through a network 112.

In some embodiments, the network 112 may be a data network such as, but not limited to, the Internet, a local area network (LAN), a wide area network (WAN), a metropolitan area network (MAN), and so forth. Embodiments of the present disclosure are intended to include or otherwise cover any type of the data network, including known, related art, and/or later developed technologies. In general, such a network may include or be formed by any suitable type of connection between devices. For example, the network can include or be formed by wired connections, such as physical cables, like Ethernet, or wireless connections, such as radio waves, Wi-Fi, Bluetooth, AirPlay®, cellular networks, or the like.

In some embodiments, the image collection unit 102 includes a camera 114 configured to collect image data. In some examples, the image data may include still images and/or video data. In some embodiments, the image collection unit 102 is configured to transmit the collected image data to the processing circuitry 106. Such transmission can be performed by a suitable connection between the image collection unit 102 and the processing circuitry 106. In some embodiments, the image collection unit 102 includes a wireless communication module that enables the image collection unit 102 to connect wirelessly to the processing circuitry 106.

In some embodiments, the camera 114 may be configured to capture real-time visual data including the image data and/or video streams of a child's environment. In some embodiments, the camera 114 may be activated to capture the visual data. That is, the camera may capture the visual data in response to some external trigger, such as a user initiating a camera capture mode. In some embodiments, the camera 114 may operate continuously. In some embodiments, the camera 114 may be automatically activated based on some trigger, such as detecting motion within a visual field of the camera. In some embodiments, the camera 114 may be activated based on a predefined schedule. In some embodiments, the video streams may be processed either locally in the camera 114 or transmitted to a suitable processor, such as a server (not shown), where the video streams undergo preprocessing steps such as noise reduction, frame selection, and resolution adjustment. Such processing or pre-processing can be performed before the video data is transferred to the processing circuitry 106 of the system 100.

In general, the camera 114 may be any suitable camera capable of capturing image and/or video data. Examples of cameras include, but are not limited to, a standard red, green, blue (RGB) camera, an infrared (IR) camera, a depth camera, a multi-sensor camera, a night-vision camera, a multi-spectral camera, and the like. Embodiments of the present disclosure are intended to include or otherwise cover any type of the camera 114, including known, related art, and/or later developed technologies. In some embodiments, the camera 114 may be a single imaging device positioned in a fixed location to capture the image data of the child's environment. In some embodiments, multiple cameras may be deployed at different locations to provide a comprehensive view, enabling a more accurate assessment of the child's activities.

In some embodiments, the camera 114 may be installed on walls or ceilings to provide a wide-angle view of the child's environment. In some embodiments, the camera 114 may be integrated with existing smart home setups or security systems, allowing connectivity with home automation systems. In some embodiments, the camera 114 may be placed on shelves, furniture, baby cribs, or the like to focus on specific areas. Such placement can be facilitated by placing the camera in a stable base or a mounting bracket. In some embodiments, multiple cameras may be deployed in different rooms to track a child's movement across various locations.

The audio capturing unit 104 is configured to collect audio data. In some embodiments, the audio capturing unit 104 may include one or more microphones that may be positioned within the child's environment to capture the audio data in real time. In some embodiments, the microphones may continuously record sounds from the child's environment, picking up a wide range of noises, including conversations, movement, and environmental sounds. In some embodiments, the audio capturing unit 104 may be configured to convert the sounds that are in the form of audio signals to digital data for further analysis. In some embodiments, the audio capturing unit 104 may operate continuously. In some embodiments, the audio capturing unit 104 may be activated based on motion or sound events. Such activation may cause, be caused by, or be linked to activation of the image collecting unit 102. That is, the camera 114 of the image collecting unit can detect motion and thereby become activated. When activated, the camera 114 can send a signal to the audio capturing unit 104 that causes the audio capturing unit 104 to also be active. Conversely, the audio capturing unit 104 can detect a sound and thereby become activated. When activated, the audio capturing unit 104 can send a signal to the camera 114 of the image collecting unit 102 that causes the camera 114 to also become activated. The audio capturing unit 104 can be configured to detect any suitable sound, such as a particular keyword or phrase, sound having a certain parameter profile, such as a specific frequency range, sound of some threshold volume, and the like. In some embodiments, the audio capturing unit 104 may be activated based on the predefined schedules. In some embodiments, the collected audio data may be stored in an internal memory of the audio capturing unit 104. In some embodiments, the audio capturing unit 104 is configured to transmit the collected audio data to the processing circuitry 106.

In some embodiments, the audio capturing unit 104 may be, but not limited to, integrated microphones within the camera 114, smart monitors, wearable audio sensors, directional microphones (used to capture sounds from specific areas), and so forth. Embodiments of the present disclosure are intended to include or otherwise cover any type of the audio capturing unit 104, including known, related art, and/or later developed technologies. In some embodiments, the microphone(s) may be placed in locations such as near a child's play area, in a child's room, or in common areas where the child spends time, ensuring a comprehensive coverage of child's activities.

In some embodiments, the audio capturing unit 104 may be installed near a crib, a bed, or a play area to detect distress sounds, sudden movements, or unusual noise patterns. In some embodiments, the audio capturing unit 104 may be installed on a shelf, a wall, or a ceiling to monitor general activity. In some embodiments, the audio capturing unit 104 may be positioned near dining tables or counters to detect the sounds of potential hazards such as a child climbing onto surfaces or interacting with kitchen appliances. In some embodiments, the audio capturing unit 104 may be mounted near stairways or hallways to monitor the child's movement and detect falls, slips, or distress signals. In some embodiments, the audio capturing unit 104 may be installed near bathtubs or sinks to capture the sounds of splashing, slipping, or potential drowning risks. In some embodiments, the audio capturing unit 104 may be installed in a child's backpack or clothing (i.e., small wearable audio sensors) that allow real-time monitoring of the child's environment even outside a home.

In some embodiments, the processing circuitry 106 is configured to execute computer-executable instructions to perform operations associated with the system 100. In some embodiments, these executable instructions can be stored in a non-transitory computer-readable medium. In general, the processing circuitry 106 can be any suitable processing circuitry known to one of ordinary skill in the art. Examples of suitable processing circuitry include, but are not limited to, a programmable logic control unit (PLC), a microcontroller, a microprocessor, a computing device, a development board, a computer, and so forth. Embodiments of the present disclosure are intended to include or otherwise cover any type of the processing circuitry 106, including known, related art, and/or later developed technologies.

In some embodiments, the processing circuitry 106 may be configured with the LLMs 116 that may be trained to assess and analyze context information 152 related to the child's environment and activities. In some embodiments, the LLMs 116 may be designed to process and interpret data, such as the audio data, the image data, and other contextual inputs (e.g., time of day, season, indoor temperature, a signal from another device such as a smoke detector, and the like), and generate predictions regarding potential risks or hazardous child activities. In general, the LLMs 116 may be or include any suitable LLM or LLM component. Examples of LLMs and LLM components include, but are not limited to, bidirectional encoder representations from transformers (BERT), generative pre-trained transformers (GPT), and so forth. Embodiments of the present disclosure are intended to include or otherwise cover any type of the LLMs 116, including known, related art, and/or later developed technologies. In some embodiments, the processing circuitry 106 may be configured with other computing models such as, but not limited to, convolutional neural networks (CNNs), recurrent neural networks (RNNs), transformer models (i.e., non-LLM), support vector machines (SVM), and so forth.

In some embodiments, the processing circuitry 106 includes a child detection module 118. In some embodiments, the processing circuitry 106 includes an activity prediction module 120. In some embodiments, the processing circuitry 106 includes an environmental extraction module 122. In some embodiments, the processing circuitry 106 includes a risk assessment module 124. In some embodiments, the processing circuitry 106 includes a notification module 126.

In some embodiments, the child detection module 118 is configured to receive the image data from the image collection unit 102 through the network 112. In some embodiments, the child detection module 118 is configured to detect the presence of the child in the image data. In some embodiments, the child detection module 118 may be configured to process the image data using computer vision techniques. Examples of suitable computer vision techniques that may be used include, but are not limited to, the CNNs, region-based CNN (R-CNN), you only look once (YOLO), face recognition, and so forth. Embodiments of the present disclosure are intended to include or otherwise cover any computer vision technique, including known related art and/or later developed technologies.

In some embodiments, the child detection module 118 may be configured to perform image processing on the image data. For example, the child detection module 118 can pass the image data through an image processing pipeline, where the image data is pre-processed to, for example, enhance clarity and remove noise. In some embodiments, the child detection module 118 may be configured to analyze the image data using object detection algorithms to identify features of the child, such as body shape, facial features, typical poses, and so forth. Examples of object detection algorithms that may be used include, but are not limited to, the CNNs, object localization, semantic or instance segmentation, and so forth. Embodiments of the present disclosure are intended to include or otherwise cover any object detection algorithms, including known related art and/or later developed technologies.

In some embodiments, the child detection module 118 may be configured to differentiate between the child and other objects in the environment. Such differentiation can be achieved by, for example, comparing the identified features with features recognized by pre-trained models (e.g., YOLO, MobileNet, residual networks). For example, if the pre-trained models are trained to detect specific child-related features such as a face or body shape, the child detection module 118 may be configured to match the identified features in the image data with the features that the pre-trained models have been trained to recognize. In some embodiments, the child detection module 118 may be configured to generate an activity prediction signal when at least some of the identified features match the features recognized by the pre-trained models, thus indicating the presence of the child in the image data. In some embodiments, the child detection module 118 may be configured to transmit the generated activity prediction signal to the activity prediction module 120. In some embodiments, if no features are matched with the features recognized by the pre-trained models, indicating that the child is not detected in the image data, the child detection module 118 may be configured to continue receiving the image data from the image collection unit 102.

In some embodiments, the activity prediction module 120 is communicatively connected to the child detection module 118. In some embodiments, the activity prediction module 120 is configured to receive the activity prediction signal from the child detection module 118. In some embodiments, upon receiving the activity prediction signal, the activity prediction module 120 is configured to determine an activity in which the child is engaged, based on the image data. In some embodiments, the activity prediction module 120 is configured to determine the activity in which the child is engaged, based on the image data and the audio data.

In some embodiments, the activity prediction module 120 may be configured to process the image data to extract image features associated with a child's behavior, such as posture, movement, gestures, and other relevant visual cues using techniques, such as, but not limited to, pose estimation models, optical flow techniques, gesture recognition, and so forth. For example, the pose estimation models, such as OpenPose may be employed to identify child's body posture and limb positions in the video frames. Similarly, optical flow techniques may be used to track the motion of the child across the video frames, helping to capture a direction, speed, and patterns of movement. In addition to or instead of image analysis, the activity prediction module 120 may also be configured to process the audio data collected from the surrounding environment to enhance an activity prediction. In some embodiments, the audio data may be analyzed for extracting acoustic features, such as, but not limited to, pitch, intensity, frequency variations, and so forth, to detect activity-related sounds, such as footsteps, jumping impact, crying, laughing, or verbal cues. In some embodiments, audio classification models may be used to recognize distinct sound patterns corresponding to different activities, further improving accuracy in identifying a child's engagement.

In some embodiments, the activity prediction module 120 may be configured to compare the extracted features (i.e., image features and/or acoustic features) with predefined patterns or models that have been trained to recognize specific activities, such as running, jumping, or playing. As used herein, the term "patterns" refers to specific features (like posture, movement, and gestures) that characterize different activities, while "models" refer to machine learning algorithms (such as CNNs or RNNs) that have been trained to identify the patterns associated with the different activities. If the extracted features match or closely resemble the patterns of known activities, then the activity prediction module 120 is configured to analyze the extracted features by evaluating both static and dynamic features of the child's behavior. In some embodiments, the static features, such as the posture, may be assessed to determine child's body orientation, while the dynamic features, such as movement and gestures, may be tracked across multiple video frames to capture temporal changes (i.e., variations or differences that occur over time). Additionally, in some embodiments, the audio cues may be cross-referenced with visual patterns to refine the activity prediction. For example, if the image data suggests a jumping motion but the audio data lacks a characteristic landing sound, the activity prediction module 120 may be configured to reassess the activity prediction for greater accuracy.

In some embodiments, the activity prediction module 120 may be configured to identify specific patterns in the movement, e.g., the speed, and a trajectory, that may differentiate between various activities. For example, running may involve a faster, more consistent movement pattern compared to jumping, as the jumping involves rapid changes in a vertical position. Similarly, the activity prediction module 120 may be configured to perform analysis of the audio data over time, which allows differentiation of similar visual activities. For example, walking and running may appear visually alike, but running is associated with a higher impact sound and a faster rhythmic footstep pattern.

In some embodiments, the activity prediction module 120 may be configured to perform temporal analysis of the movement, which involves tracking how child's actions evolve over time, helping to capture the changes in the movement patterns. By analyzing the movement and corresponding sound cues over time, the activity prediction module 120 may be configured to distinguish between the activities that may appear similar at a single point in time but have different dynamics. For instance, the audio cues of rapid speech, clapping, or toy interactions may indicate playful activities, whereas sustained silence combined with minimal movement may indicate inactivity or potential risk.

Figure 1B:
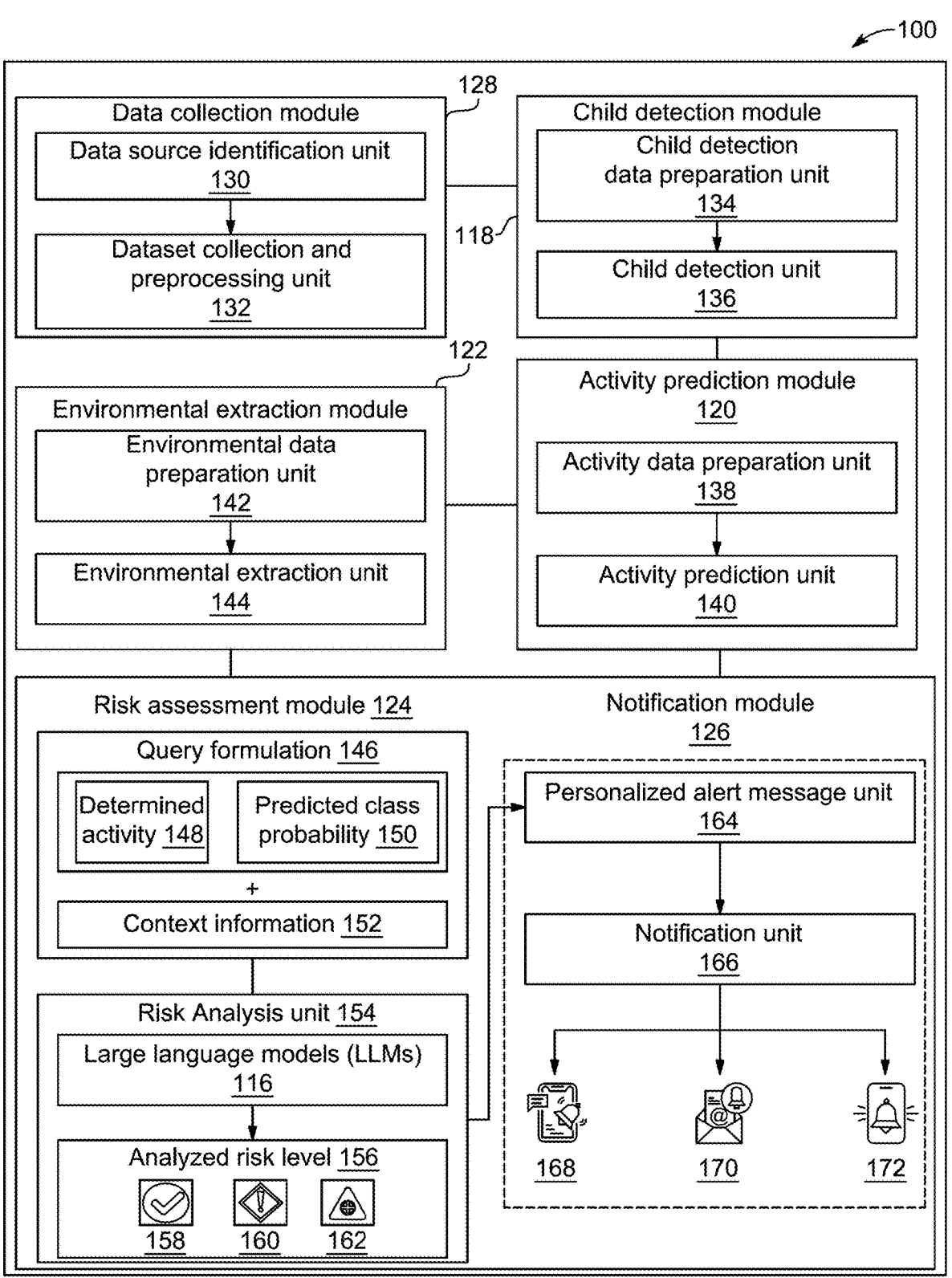
FIG. 1B illustrates a detailed block diagram of the child monitoring system for anticipating and assessing risks in child hazardous activities, according to certain embodiments.

Upon analyzing the features, the activity prediction module 120 may be configured to determine the activity in which the child is engaged based on the extracted and analyzed features. In some embodiments, the activity prediction module 120 may be configured to determine the activity by applying machine learning models or rule-based systems that have been trained to recognize the patterns associated with specific activities. In some embodiments, the activity prediction module 120 is configured to transmit the determined activity 148 (as shown in FIG. 1B) of the child to the risk assessment module 124.

In some embodiments, the environmental extraction module 122 is communicatively connected to the activity prediction module 120. In some embodiments, the environmental extraction module 122 is configured to extract the context information 152 related to the environment, such as where the child is engaging in the activity based on the image data. In some embodiments, the environmental extraction module 122 is configured to extract the context information 152 related to the environment, such as where the child is engaging in the activity based on the image data and the audio data. In some embodiments, the environmental extraction module 122 is configured to extract the context information 152 upon determining the activity in which the child is engaged. As used herein, the context information 152 refers to a set of environmental, situational, and behavioral data that provides a comprehensive understanding of the surroundings in which the activity is occurring. In some embodiments, the context information 152 includes environmental context (i.e., details about physical surroundings, including location (e.g., playground, living room, street), objects present (e.g., toys, furniture, vehicles), and potential hazards (e.g., stairs, sharp edges, open flames)), object interactions (child's interaction with surrounding objects, such as holding a toy, touching an electrical outlet, or playing near water), and so forth.

In some embodiments, the environmental extraction module 122 may be configured to analyze both visual elements and auditory elements to gain a comprehensive understanding of the environment, helping to refine environmental extraction and risk assessment. In some embodiments, the environmental extraction module 122 may be configured to analyze the visual elements captured in the image data, such as the location, the objects, and a layout in the environment, to determine a context in which the child is active. In some embodiments, the environmental extraction module 122 may be configured to first identify objects and regions within a scene using image segmentation and object detection algorithms, isolating essential elements such as the furniture, the walls, the toys, or any other objects relevant to the child's activity. For example, the CNNs may be trained to recognize common objects and environmental features that may be used to enhance object identification and scene understanding.

In some embodiments, in addition to image analysis, the environmental extraction module 122 may be configured to process the audio data to extract the context information 152 from surrounding sounds. In some embodiments, the environmental extraction module 122 may be configured to analyze the auditory features such as sound intensity, pitch, and frequency variations to detect relevant environmental cues. For example, the presence of background music, television noise, or human speech may provide additional context about the child's environment. Moreover, specific sounds such as footsteps, toy interactions, or sudden loud noises may indicate dynamic interactions within the environment.

In some embodiments, the environmental extraction module 122 may be configured to analyze spatial relationships between the objects to understand the layout of the environment. In some embodiments, the spatial relationships may be used to determine if the child is near a potentially dangerous object or if the environment presents specific risks, such as proximity to the stairs, sharp edges, or electrical appliances. In some embodiments, the environmental extraction module 122 may be configured to enhance contextual awareness by cross-referencing the auditory elements with the visual elements.

In some embodiments, the environmental extraction module 122 may be configured to analyze motion patterns or changes in the scene over time to extract the context information 152 about the environment. In some embodiments, the changes may include variations in object positions, shifts in lighting conditions, or the presence of moving elements within the scene. In some embodiments, the environmental extraction module 122 may also be configured to analyze variations in ambient noise levels over time to identify environmental interactions, such as background sounds indicating nearby activity or sudden changes that may signal potential hazards.

In some embodiments, the environmental extraction module 122 may also be configured to analyze contextual relationships between the objects and the sounds within the environment. For example, the spatial arrangements of the objects, the proximity of the objects to each other, and the ambient sounds may provide insights into environmental interactions. By integrating static elements (such as object positions and layout), dynamic elements (such as movement of objects), and auditory cues (such as background noise patterns), the environmental extraction module 122 may be configured to construct a comprehensive representation of the surroundings.

In some embodiments, the environmental extraction module 122 may be configured to process textual information associated with the image data and the audio data, such as metadata, labels, or descriptions that provide further context. In some embodiments, the textual information may include timestamps, location tags, annotations from external sources, or captions that define a setting, such as whether the activity is indoors or outdoors, and any relevant environmental conditions. By integrating visual, auditory, and the textual information, the environmental extraction module 122 may be configured to enhance its ability to interpret the surroundings accurately. The environmental extraction module 122 is configured to transmit the extracted context information 152 to the risk assessment module 124 for further analysis.

In some embodiments, the risk assessment module 124 is communicatively connected to the environmental extraction module 122. In some embodiments, the risk assessment module 124 is configured to determine a risk based on the activity the child is engaged in and the context information 152. In some embodiments, the risk assessment module 124 may be configured to determine the risk associated with the determined activity 148 by cross-referencing the determined activity 148 and the context information 152 with predefined risk parameters. In some embodiments, the predefined risk parameters are criteria to evaluate a potential danger associated with the child's activity in a given environment. In some embodiments, the predefined risk parameters may include an activity type, environmental conditions, proximity to hazardous objects, and so forth. In some embodiments, the risk assessment module 124 utilizes the LLMs 116, to assess the potential hazards by formulating structured queries. In some embodiments, the extracted context information 152, which may include the visual elements (e.g., objects, layout, and spatial relationships), the auditory elements (e.g., footsteps, sudden noises), motion patterns (e.g., jumping), and textual metadata (e.g., time, annotations), along with the determined activity 148 of the child, may be processed and converted into a structured query that the LLMs 116 may analyze. For example, the risk assessment module 124 may be configured to formulate a query such as "Analyze the risk level of the child in the play area climbing on a tree." In some embodiments, the risk assessment module 124 is configured to process the structured query to determine the risk level using the LLMs 116. In some embodiments, the LLMs 116 may evaluate the structured query by referencing prior knowledge, learned risk patterns, and applying trained risk assessment criteria. In some embodiments, the LLMs 116 may consider factors such as the likelihood of injury based on the child's movement patterns, the nature of surrounding objects, and the potential hazards within the environment. In some embodiments, the LLMs 116 may correlate a current scenario with historical data or predefined safety rules to determine possible outcomes and assess the severity of potential injuries. In some embodiments, based on the correlation, the LLMs 116 may evaluate factors such as a child's age, activity type, environmental hazards, and prior incident patterns to estimate the likelihood of the injury. In some embodiments, based on the likelihood of the injury, the LLMs 116 may assign the risk level (e.g., low, moderate, or high) and a confidence score (P), which represents a certainty of risk assessment. In some embodiments, the risk assessment module 124 is configured to transmit the analyzed risk level 156 (as shown in FIG. 1B) to the notification module 126.

In some embodiments, the notification module 126 is communicatively connected to the risk assessment module 124. In some embodiments, the notification module 126 is configured to generate a personalized message based on the analyzed risk level 156. In some embodiments, the personalized message refers to an alert that is dynamically tailored based on specific risk factors (i.e., the severity of the analyzed risk level 156), the context information 152 (i.e., child's location, movement pattern, and environmental condition), and caretaker preferences (i.e., message tone, urgency, and delivery method based on predefined caretaker settings). In some embodiments, the personalized message may be a caretaker alert tailored to a situation, providing specific recommendations and action steps for the caretakers.

In some embodiments, the notification module 126 is configured to transmit the personalized message (i.e., caretaker alert) to the caretaker device 108. In some embodiments, the notification module 126 is also configured to generate a child alert. In some embodiments, the child alert includes, but is not limited to, visual cues (animated warnings, stop signs, directional guidance), auditory instructions (spoken warnings like "step away from the door"), haptic feedback (vibrations on wearable devices to signal danger), and so forth. In some embodiments, the child alert includes real-time visual instructions that guide the child away from potential hazards. In some embodiments, the notification module 126 is configured to transmit the child alert to the child alert device 110. In some embodiments, the child alert may be transmitted through interactive screens, smart home assistants, wearable devices, and so forth. Embodiments of the present disclosure are intended to include or otherwise cover any transmission medium, including known, related art, and/or later developed technologies.

In some embodiments, the caretaker device 108 is configured to receive the caretaker alert from the notification module 126. In some embodiments, the caretaker device 108 may be configured to receive the caretaker alert from the notification module 126 through various communication methods. In some embodiments, the communication methods may be but are not limited to, wireless communication (e.g. wireless fidelity (Wi-Fi), Bluetooth, cellular), a short message service (SMS), a direct wired communication (e.g., universal serial bus (USB)), a local network, a cloud-based messaging service, and so forth. For example, the caretaker device 108 may be configured with a wireless communication interface (e.g., Wi-Fi, Bluetooth, or cellular network) to receive the caretaker alert as a message from the notification module 126. In some embodiments, if the caretaker device 108 is part of the local network, the notification module 126 may send the alert over Ethernet or LAN connections. In some embodiments, the caretaker device 108 may be connected to the same network, allowing for real-time alert reception through the local server or service. Embodiments of the present disclosure are intended to include or otherwise cover any communication method, including known, related art and/or later developed technologies.

In some embodiments, the caretaker alert may be received in multiple formats such as, but not limited to, audio alert, textual alert, application-based alert (push notification), written alert (via email or message), and so forth. Embodiments of the present disclosure are intended to include or otherwise cover any format, including known, related art and/or later developed technologies. In some embodiments, the caretaker alert may be of any type such as, but not limited to, a hazardous activity alert (e.g., child is approaching a hazardous area), a behavioral risk alert (e.g., child is engaging in risky behavior (climbing high)), a proximity alert (e.g., child is too close to a hot surface. Immediate action required), an exit alert (e.g., child is attempting to exit the safe zone. Please check), a time-based alert (e.g., child has been playing for 30 minutes. Time for a break), a general safety alert (e.g., monitor child's current activity, potential risk detected), and so forth. Embodiments of the present disclosure are intended to include or otherwise cover any type of caretaker alert, including known related art and/or later-developed technologies.

In some embodiments, the caretaker may be, but not limited to, parents, guardians, teachers, relatives, health professionals, daycare providers, and so forth. Embodiments of the present disclosure are intended to include or otherwise cover any caretaker. In some embodiments, the caretaker device 108 may be, for example, but not limited to, a mobile device, a portable computer, a laptop, a desktop, and so forth. In some embodiments, the caretaker device 108 is a smartphone. Embodiments of the present disclosure are intended to include or otherwise cover any type of the caretaker device 108, including known, related art, and/or later developed technologies. In some embodiments, the caretaker device 108, as may be readily appreciated by a person skilled in the art, is merely intended to illustrate and not to limit what may encompass the caretaker device 108, such as, but not limited to, an instant messaging sending device, a short message service (SMS) transmitting device, and/or other messaging devices that may include, but not limited to, a text, graphics, symbols and/or other identifiable communications. In some embodiments, the caretaker device 108 may be a multipurpose device, such that an operation in accordance with the present system 100 is merely one of many (e.g., two or more) features that may be provided by the caretaker device 108.

In some embodiments, the child alert device 110 is configured to receive the child alert from the notification module 126. In some embodiments, the child alert device 110 may be configured to receive the child alert from the notification module 126 through various communication methods. In some embodiments, the communication methods may be, but are not limited to, wireless communication (e.g., wireless fidelity (Wi-Fi), Bluetooth, cellular), short message service (SMS), push notifications, haptic feedback, and so forth. Embodiments of the present disclosure are intended to include or otherwise cover any communication method, including known, related art and/or later developed technologies.

In some embodiments, the child alert may be received in multiple formats such as, but not limited to, the textual alert, the application-based alert (push notification), the written alert (via email or message), and so forth. In some embodiments, the child alert may be a verbal alert. Embodiments of the present disclosure are intended to include or otherwise cover any format, including known, related art, and/or later developed technologies.

In some embodiments, the child alert may include, but is not limited to, visual instructions (i.e., short written messages displayed on a screen (e.g., "Step away from a sharp object")), auditory signals (e.g., different tones or alerts to convey urgency (e.g., a beeping sound for a minor risk or a loud alarm for high-risk situations), the haptic feedback (tactile instructions), actionable instructions, and so forth. In some embodiments, the child alert includes verbal instructions (i.e., spoken messages or commands conveyed through a sound to the child). Embodiments of the present disclosure are intended to include or otherwise cover any type of the child alert, including known, related art, and/or later developed technologies.

In some embodiments, the child alert device 110 may be worn on the wrist of the child. In some embodiments, the child alert device 110 may be integrated into a child's clothing. In some embodiments, the child alert device 110 may be incorporated into a child's shoes or footwear. In some embodiments, the child alert device 110 may be worn as a headband or hat or integrated into a child's headgear. In some embodiments, the child alert device 110 may be mounted in a child's vehicle seat or a car safety system. The child alert device 110 may be integrated into smart furniture or play equipment, such as the cribs, strollers, or highchairs.

In some embodiments, the child alert device 110 may include, but is not limited to, the smartphone, a wearable device (e.g., a smartwatch), a wearable camera with a communication facility, an interactive toy, an education device, a smart speaker with an assistant, a portable child's safety device, an interactive wall-mounted device, and so forth. Embodiments of the present disclosure are intended to include or otherwise cover any type of the child alert device 110, including known, related art and/or later developed technologies.

FIG. 1B illustrates a detailed block diagram of the system 100 for anticipating and assessing the risks in the child's hazardous activities, according to certain embodiments. In some embodiments, the system 100 includes a data collection module 128, the child detection module 118, the activity prediction module 120, the environmental extraction module 122, the risk assessment module 124 and the notification module 126. In some embodiments, the data collection module 128 ensures that all relevant data from the child's environment is gathered, processed, and prepared for subsequent analysis. In some embodiments, the data collection module 128 is configured to capture real-time information from multiple sensory sources (i.e., the camera 114 and the microphones), enabling a comprehensive understanding of the surroundings. In some embodiments, the data collection module 128 includes a data source identification unit 130 and a dataset collection and preprocessing unit 132.

In some embodiments, the data source identification unit 130 is configured to identify and manage sources (i.e., image data sources and audio data sources) from which the image data and the audio data are collected to monitor the child's environment effectively. In some embodiments, the image data sources may include, but are not limited to, the RGB cameras, depth sensors, the IR cameras, light detection and ranging (LIDAR), and so forth which capture real-time images and videos of the surroundings, and the child's movements. In some embodiments, the image data sources may be useful in tracking the posture and the gestures of the child and the proximity to the potential hazards. In some embodiments, the audio data sources may include, but are not limited to, the microphones, the smart speakers, wearable audio sensors, and so forth that capture environmental sounds, speech, and sudden noises, providing the context about ongoing activities. In some embodiments, a combination of the image data sources, and the audio data sources ensures a comprehensive understanding of the child's surroundings, allowing for accurate activity recognition and the risk assessment.

In some embodiments, the dataset collection and preprocessing unit 132 is configured to continuously collect input data (i.e., the image data and the audio data) from the identified sources (i.e., the image data sources, and the audio data sources). In some embodiments, the dataset collection and preprocessing unit 132 may employ an adaptive sampling approach to optimize the collection of the input data. In some embodiments, the adaptive sampling approach ensures that high-quality input data is captured while minimizing unnecessary processing overhead. For example, frame rates for video capture may be dynamically adjusted based on a child's movement intensity, allowing efficient data handling without excessive computational burden. In some embodiments, if the child is highly active, the dataset collection and preprocessing unit 132 increase the frame rate for finer motion tracking, whereas, during periods of inactivity, the dataset collection and preprocessing unit 132 reduces the frame rate to conserve resources. Similarly, in some embodiments, the dataset collection and preprocessing unit 132 may be configured to capture relevant sounds based on detected environmental cues, filtering out insignificant background noise.

In some embodiments, to enhance the quality and consistency of the collected input data, the dataset collection and preprocessing unit 132 may be configured to perform several preprocessing tasks, such as noise reduction, image normalization, framing adjustment, timestamp alignment, feature extraction, and so forth. In some embodiments, the dataset collection and preprocessing unit 132 may be configured to apply noise reduction techniques (e.g., gaussian blur filtering, median filtering, spectral subtraction, and so forth) to remove unwanted disturbances, such as filtering background noise in the audio data or reducing visual artifacts in the image data, ensuring clearer input data for analysis.

In some embodiments, the dataset collection and preprocessing unit 132 may be configured to perform the image normalization to adjust brightness, contrast, and resolution to standardize the image data, preventing inconsistencies caused by varying lighting conditions. In some embodiments, the dataset collection and preprocessing unit 132 may be configured to perform framing adjustments to maintain focus on the child's activity by ensuring that relevant objects remain within a camera's field of view while cropping out irrelevant areas that may interfere with the analysis.

In some embodiments, the dataset collection and preprocessing unit 132 may also be configured to extract features such as the objects in the image data, the movement patterns, and sound frequency ranges for further analysis. In some embodiments, by systematically processing the input data (raw data) and structuring the input data for downstream components, the dataset collection and preprocessing unit 132 ensures that high-quality input data is provided to subsequent modules, such as the child detection module 118, the activity prediction module 120, the environmental extraction module 122 and the risk assessment module 124.

As shown in FIG. 1A, the child detection module 118 is configured to detect the presence of the child in the image data. In some embodiments, the child detection module 118 includes a child detection data preparation unit 134 and a child detection unit 136.

In some embodiments, the child detection data preparation unit 134 is configured to collect, annotate, and organize a dataset required to train a child detection model. In some embodiments, the child detection model may be the pretrained model trained to detect specific child-related features. In some embodiments, the child detection model may be, but not limited to, the YOLO, the Faster R-CNN, and so forth. In some embodiments, training of the child detection model may be explained in detail in conjunction with FIG. 3.

In some embodiments, the child detection data preparation unit 134 is configured to prepare the dataset through frame sampling, where frames are extracted at specific intervals (e.g., one frame per second) from the image data to ensure the inclusion of diverse child's postures, the child's movements, and environmental conditions in the dataset. In some embodiments, by sampling the frames at regular intervals, the dataset captures variations in the child's activities, lighting conditions, and occlusions, improving the robustness of the child detection model. In some embodiments, each frame is then annotated using an automated detection model (e.g., YOLO, Faster R-CNN), where bounding boxes are drawn around the child in the frame to specify an exact location of the child in the frame. In some embodiments, the bounding boxes may be labelled as "child" or 'not a child" to distinguish between the child and other objects. In some embodiments, to enhance the accuracy of the child detection model, metadata such as the timestamps, scene descriptions, occlusion conditions, and the environmental context (e.g., indoors and outdoors) may be linked to each annotated frame. In some embodiments, the metadata provides contextual details, improving the ability of the child detection model to identify the child in complex environments. In some embodiments, the annotated frames form an annotated dataset (explained in detail in FIG. 3). In some embodiments, the child detection data preparation unit 134 is configured to organize and store the annotated dataset in standard formats like a common object in context (COCO) or Pascal visual object classes (VOC) to obtain a structured dataset, ensuring compatibility with deep learning frameworks. In some embodiments, the structured dataset serves as a foundation for training (explained in detail in FIG. 3) the child detection model, enabling the child detection model to accurately identify the presence of the child across diverse environments and scenarios.

In some embodiments, the child detection unit 136 may be configured to deploy the child detection model for real-time child identification within the image data. In some embodiments, the child detection model processes the frames to detect the child based on the learned child-related features. In some embodiments, the child detection unit 136 may be configured to evaluate each frame by assigning a confidence score (P), representing a likelihood that a detected object is the child. In some embodiments, the child detection unit 136 may further be configured to compare the assigned confidence score (P) against a predefined threshold (T) to validate the accuracy of child detection prediction. In some embodiments, if the confidence score (P) is greater than or equal to the predefined threshold (T) (i.e., P>=T), the child detection unit 136 classifies the detected object as the child, and the presence of the child in the image data is confirmed. In some embodiments, if the confidence score (P) is less than the predefined threshold (T) (i.e., P<T), the child detection unit 136 classifies the detected object as "not the child."

In some embodiments, the predefined threshold (T) may be determined based on model training and validation to minimize false positives (incorrectly identifying the object as the child) and false negatives (failing to detect the child when present). In some embodiments, once the child is detected, the child detection unit 136 may be configured to mark a position within the frame using the bounding boxes and transmit the data associated with the child detection to the activity prediction module 120 and the environmental extraction module 122.

In some embodiments, the activity prediction module 120 is configured to determine the activity in which the child is engaged, based on the image data. In some embodiments, the activity prediction module 120 is configured to determine the activity in which the child is engaged, based on the image data and the audio data. In some embodiments, the activity prediction module 120 includes an activity data preparation unit 138 and an activity prediction unit 140.

In some embodiments, the activity data preparation unit 138 is configured to collect, annotate, and organize a dataset required to train an activity prediction model such as, but not limited to, the RNNs, long short-term memory (LSTM) networks, temporal convolutional networks (TCNs), and so forth. In some embodiments, training of the activity prediction model may be explained in detail in conjunction with FIG. 3. In some embodiments, the activity data preparation unit 138 ensures that both the image data and the audio data are structured effectively to determine the activity in which the child is engaged. In some embodiments, the activity data preparation unit 138 may be configured to first extract the frames from the collected image data to capture the child's movements and postures. Unlike static frame-based detection, in some embodiments, the activity data preparation unit 138 may be configured to obtain temporal information, by analyzing sequences of consecutive frames rather than individual frames. In some embodiments, the activity data preparation unit 138 may be configured to annotate each extracted frame with corresponding activity labels (e.g., "playing," "walking," "sitting," "climbing") to create an annotated dataset (explained in detail in FIG. 3). In some embodiments, the activity data preparation unit 138 is configured to organize the annotated dataset into a structured format suitable for the sequence-based activity prediction model.

In some embodiments, in addition to the image data, the activity data preparation unit 138 may also be configured to process the audio data by detecting auditory cues linked to specific child's activities, such as speech patterns, laughter, crying, or interactions with objects. In some embodiments, the activity data preparation unit 138 may be configured to preprocess the audio data by performing preprocessing steps such as noise reduction (e.g., filtering out background noise, isolating child-related sounds), the feature extraction (e.g., identifying frequency patterns, pitch, and amplitude changes related to child's movements), temporal segmentation (e.g., aligning audio events with visual frame sequences). In some embodiments, the activity data preparation unit 138 may be configured to annotate audio features with corresponding activity labels, forming an annotated audio dataset. For example, an audio clip with running footsteps may be labelled as "running," while an audio clip with laughter or playful shouting may be labelled as "playing." The annotated audio dataset may be integrated with the annotated dataset (annotated image dataset) to create a multi-modal training dataset, improving the ability of the activity prediction model to recognize and predict the child's activities more accurately.

In some embodiments, the activity prediction unit 140 is configured to deploy the activity prediction model to determine the activity of the child based on the image data or the audio data. In some embodiments, the activity prediction unit 140 analyzes the visual and auditory elements to predict child's ongoing and imminent activities. In some embodiments, the activity prediction unit 140 utilizes the activity prediction model to capture motion continuity and contextual dependencies.

In some embodiments, during real-time prediction, the activity prediction model can process incoming data (i.e., image data and/or audio data) to determine the child's activities. In some embodiments, the activity prediction model can assign a class index (C) and predicted class probability (P) to each determined activity 148. In some embodiments, the class index (C) can represent a category of the determined activity 148 (e.g., "walking," "running," and "sitting"), where each valid activity is assigned a unique nonzero index. For example, if C=0, the determined activity 148 is considered unknown, ambiguous, or outside a predefined set of recognizable activities. In some embodiments, the predicted class probability (P) 150 is a confidence score that quantifies how certain the model is about the prediction of the activity. In some embodiments, the confidence score is generated using a softmax function in the final layer of the model, which converts raw outputs into probability values ranging from 0 to 1. In some embodiments, the activity prediction unit 140 evaluates the predicted class index (C) and corresponding class probability (P) to determine the validity of the determined activity 148. In some embodiments, the activity is considered valid if C!=0 (indicating that the determined activity 148 corresponds to a known activity) and P>=Anticipation Threshold (T) (ensuring a high-confidence prediction). In some embodiments, the Anticipation Threshold (T) is a predefined confidence level that ensures only high-confidence predictions are considered valid. In some embodiments, if both conditions are met, the activity prediction unit 140 may be configured to validate the determined activity 148 and transmit the determined activity 148 to the risk assessment module 124. In some embodiments, the prediction (i.e., the determined activity 148) may be discarded or flagged for refinement if the determined activity 148 is deemed invalid.

In some embodiments, the environmental extraction module 122 is configured to extract the context information 152 related to the environment where the child is engaging in the activity based on the image data. In some embodiments, the environmental extraction module 122 is configured to extract the context information 152 related to the environment where the child is engaging in the activity based on the image data and audio data. In some embodiments, the environmental extraction module 122 includes an environmental data preparation unit 142 and an environmental extraction unit 144.

In some embodiments, the environmental data preparation unit 142 is configured to collect, annotate, and organize a dataset required to train an environmental extraction model. In some embodiments, training of the environmental extraction model may be explained in detail in conjunction with FIG. 3. The environmental extraction model may be, but is not limited to, computer vision-based models (YOLO, mask R-CNN), audio-based models (WaveNet), text-based context models (BERT), and so forth. In some embodiments, the environmental data preparation unit 142 ensures that the image and audio data are structured effectively for extracting the context information 152 related to the environment.

In some embodiments, the environmental data preparation unit 142 may be configured to integrate textual information, the audio data, and the frames to enrich a semantic understanding of the environmental extraction model. In some embodiments, the frames may be extracted from the collected image data to capture diverse environmental scenarios. Each frame is paired with the textual information that describes the scene (e.g., "child near the playground," "child crossing street") and object interactions (e.g., "holding toy," "walking with an adult").

In some embodiments, the audio data may also be processed to extract relevant environmental sounds that contribute to contextual awareness. For example, background sounds such as traffic noise, playground chatter, alarm signals, footsteps, or speech commands may provide additional cues about the environment. In some embodiments, the environmental data preparation unit 142 may be configured to apply audio feature extraction techniques, such as, but not limited to, mel-frequency cepstral coefficients (MFCCs), spectrogram analysis, and deep learning-based audio classification models, to extract and label audio features present in the environment. In some embodiments, the extracted audio features are then aligned with corresponding visual frames and textual descriptions to ensure multi-modal synchronization.

In some embodiments, the textual information, the audio data, and the extracted frames together form the annotated dataset (explained in detail in FIG. 3), which is structured to support multi-modal learning. In some embodiments, using the annotated dataset, the environmental data preparation unit 142 enables the environmental extraction model to extract the context information 152 more effectively.

In some embodiments, the environmental extraction unit 144 is configured to deploy the environmental extraction model to extract the context information 152 related to the environment where the child is engaging in the activity. In some embodiments, the environmental extraction unit 144 utilizes the environmental extraction model to analyze the annotated dataset and extract environmental features that may influence the child's activity. In some embodiments, using the environmental extraction model, the environmental extraction unit 144 may be configured to identify the objects, obstacles, and surrounding elements in the scene (e.g., furniture, playground equipment, road intersections) to assess potential risks. In some embodiments, the environmental extraction unit 144 may also be configured to detect the environmental sounds such as alarms, moving vehicles, or footsteps to enhance situational awareness. In some embodiments, the environmental extraction unit 144 integrates the textual descriptions and extracted environmental features to generate a comprehensive understanding of the child's surroundings, enabling accurate context-aware analysis. In some embodiments, the environmental extraction unit 144 may be configured to process incoming real-time data from the image sources and the audio sources to continuously update the context information 152. In some embodiments, the context information 152 may be used to refine activity predictions, enhance risk assessment, and trigger appropriate alerts.

In some embodiments, the risk assessment module 124 is configured to evaluate the potential risks by integrating the determined activity 148, the predicted class probability (P) 150, and the context information 152 into the structured query. In some embodiments, the risk assessment module

124 is configured to perform query formulation 146, where an output from the activity prediction unit 140 and the environmental extraction unit 144 are combined to generate an input query for the LLMs 116.

In some embodiments, once the structured query is formulated, the risk assessment module 124 may be configured to transmit the structured query to the risk analysis unit 154, where the LLMs 116 may be deployed to analyze the risk level associated with the child's activity within the given environment. In some embodiments, the LLMs 116 analyze a relationship between the determined activity 148 and the context information 152, using the prior knowledge, the learned risk patterns, and real-time input correlations. For example, if the determined activity 148 is "running" and the context information 152 indicates "wet floor," then the LLMs 116 may classify the analyzed risk level 156 as a moderate risk 160 or a high risk 162 due to the possibility of slipping. Similarly, if the determined activity 148 is "playing" and the context information 152 indicates "secured playground with no hazards", then the LLMs 116 may classify the analyzed risk level 156 as safe 158. In some embodiments, the risk analysis unit 154 is configured to transmit information associated with the analyzed risk level 156 to the notification module 126.

In some embodiments, the notification module 126 includes a personalized alert message unit 164 and a notification unit 166. In some embodiments, the personalized alert message unit 164 may be configured to generate a context-aware and human-readable alert. In some embodiments, the personalized alert message unit 164 may be configured to generate the alert based on the analyzed risk level 156. For example, if the analyzed risk level 156 indicates the high-risk 162 (e.g., the child climbing near an open balcony), the personalized alert message unit 164 may generate an urgent warning: "Alert: Your child is climbing near an open balcony. Immediate attention required!". For moderate risks 160 (e.g., running near furniture), the personalized alert message unit 164 may be configured to generate a softer cautionary message, such as "Caution: Your child is running near furniture." In some embodiments, the personalized alert message unit 164 may be configured to transmit the generated alert to the notification unit 166.

In some embodiments, the notification unit 166 is configured to receive the generated alert from the personalized alert message unit 164. In some embodiments, the notification unit 166 may be configured to transmit the alert to the caretaker device 108 through various forms, including phone messages 168, email alerts 170, in-house alerts 172, household alerts, and so forth. In some embodiments, the phone messages 168 may include SMS or application notifications directly to the caretaker device 108. In some embodiments, the email alerts 170 may include automated email notifications sent to the caretaker device 108. In some embodiments, the in-house alerts 172 may be triggered through connected home devices like smart speakers or displays, providing real-time, location-specific warnings. In some embodiments, the household alerts may involve visual or auditory cues in the home, such as flashing lights or alarms, to alert anyone in the vicinity of the potential danger.

Figure 2:
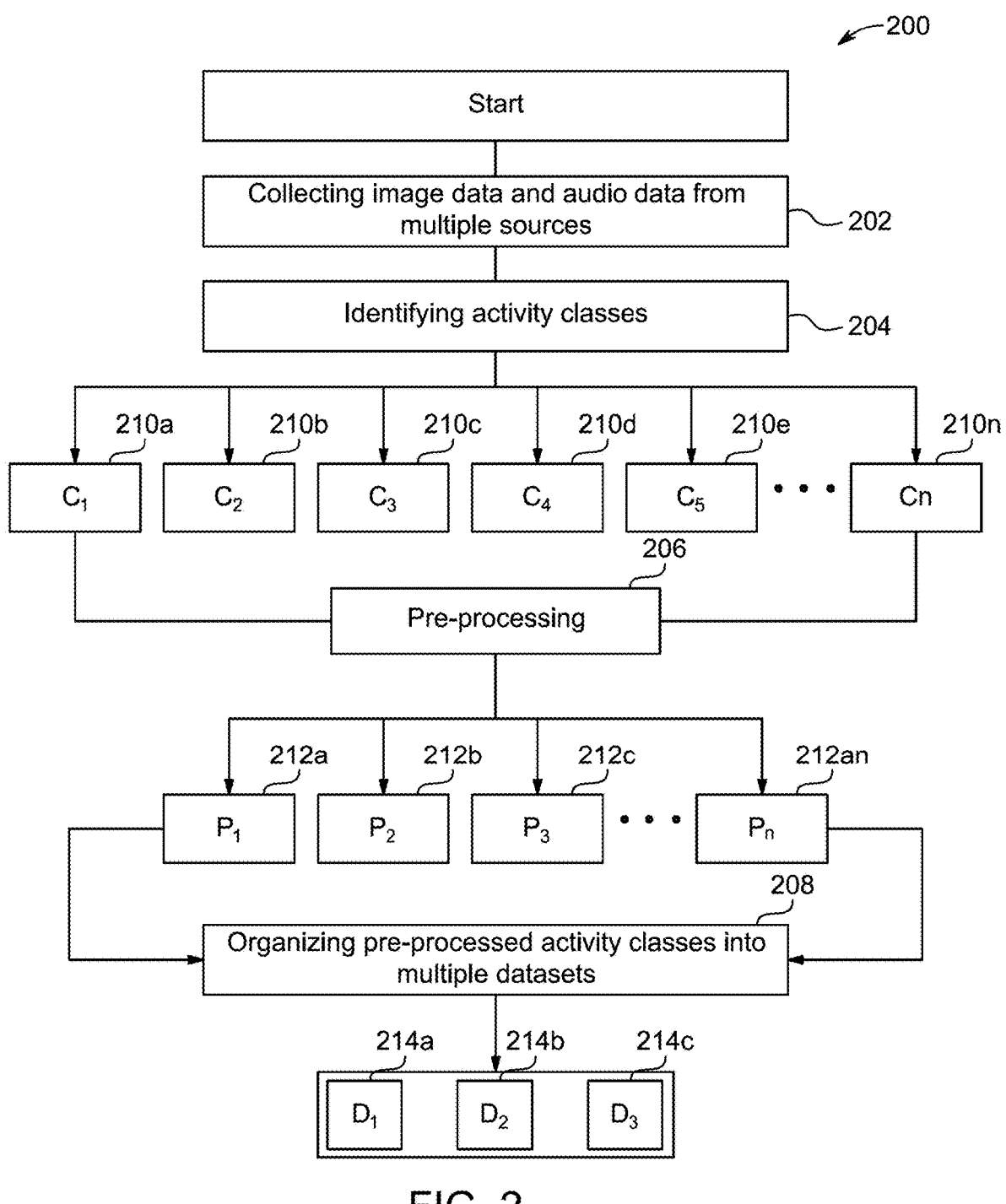
FIG. 2 illustrates a flowchart of a process for creating datasets of child's hazardous activities, according to certain embodiments.

FIG. 2 illustrates a flowchart of a process 200 for creating datasets of the child's hazardous activities, according to certain embodiments.

At step 202, the process 200 includes collecting the image data and the audio data from the multiple sensory sources. In some embodiments, the collected image data and audio data serve as raw input for training and evaluating the system 100. In some embodiments, the image data may be sourced from multiple image sources, including CCTV cameras, home security cameras, smartphone recordings, public surveillance systems, childcare facility monitoring systems, and so forth. In some embodiments, the collected image data may depict a wide range of the child's activities, including walking, running, jumping, playing with the toys, interacting with the caretakers, falling, reaching for the objects, climbing the furniture, and so forth. In some embodiments, the audio data may be sourced from multiple audio sources, such as the microphones embedded in smart home devices, the smartphone recordings, childcare facility intercoms, environmental sound monitoring systems, and so forth. In some embodiments, the collected audio data may capture various auditory cues associated with the child's activities, including the speech patterns, laughter, crying, footsteps, object interactions (e.g., toy sounds, furniture movement), and background noises that provide additional context for activity recognition.

At step 204, the process 200 includes identifying and categorizing the activities observed in the collected image data and the audio data into predefined hazardous activity classes ($C_1$ 210a, $C_2$ 210b, $C_3$ 210c, $C_4$ 210d, $C_5$ 210e . . . , $C_n$ 210n) based on associated risk levels. In some embodiments, each video sequence in the image data may be analyzed to determine the nature of the child's activity and the environment. Step 204 includes detecting the movement patterns using various computer vision techniques, such as the optical flow techniques, histogram of oriented gradients (HOG), the CNNs, and so forth, for distinguishing between different child's activities. In some embodiments, step 204 includes identifying the posture and body movements of the child using the pose estimation models (e.g., OpenPose, MediaPipe, or HRNet), which may be useful for identifying the child's hazardous activities. Once the activities are identified, the categorization may incorporate predefined safety criteria that assess factors such as the movement intensity, interaction with the objects, the proximity to potential hazards, and so forth. For example, the activities that involve simple, low-risk motions like walking or playing with the toys may be categorized under $C_1$ 210a (Low Risk), while the activities that include moderate movement or mild environmental risks, such as running indoors or climbing on the furniture, may fall under $C_2$ 210b (Moderate Risk). More dangerous actions, such as playing near electrical outlets or reaching for the sharp objects, may be classified as $C_3$ 210c (High Risk). In contrast, severe incidents like falling from a height or interacting with hazardous substances are labelled under $C_4$ 210d (Severe Risk). Once categorized, each activity class is assigned a corresponding label representing its risk level. In some embodiments, the labels are then stored as metadata associated with the video frames, enabling the system 100 to structure the dataset for subsequent training and evaluation systematically. In some embodiments, the structured labelling ensures that the system 100 accurately detects and differentiates between varying levels of the child's hazardous activities, improving the ability of the system 100 to recognize and respond to potential child safety risks.

At step 206, the process 200 includes preprocessing data associated with the labelled activity classes to clean, normalize, and prepare the data for further use in training and evaluation. In some embodiments, the data may undergo a series of pre-processing steps ($P_1$ 212a, $P_2$ 212b, $P_3$ 212c . . . , $P_n$ 212n) such as frame extraction, noise reduction, feature extraction, data augmentation, and so forth. For example, $P_1$ 212a (frame extraction) includes selecting key frames from the data to capture important moments of the child's activities. $P_2$ 212b (noise reduction) includes filtering out unwanted artifacts such as motion blur, poor lighting conditions, or occlusions that may hinder accurate activity recognition. In some embodiments, $P_3$ 212c (feature extraction) includes identifying and retaining essential attributes from the data, such as the body posture, object interactions, and movement trajectories, which help in distinguishing between different risk levels. $P_n$ 212n (data augmentation) includes applying transformations, such as rotation, scaling, flipping, and brightness adjustments, to artificially expand the dataset and improve the model's ability to generalize across various environmental conditions and perspectives. In some embodiments, the pre-processing steps collectively refine the labelled data, which may be advantageous for improving robustness in training the models and enhancing the accuracy of the system 100 in detecting the child's hazardous activities.

At step 208, the process 200 includes categorizing the pre-processed labelled activity classes into multiple datasets ($D_1$ 214a, $D_2$ 214b, $D_3$ 214c), each of which may serve a unique purpose in the system 100. For example, $D_1$ 214a represents the dataset for child detection. $D_1$ 214a dataset is created by selecting the video frames where the children are present, ensuring that the system 100 accurately identifies the children in different scenarios. In some embodiments, $D_2$ 214b represents the dataset for activity anticipation, created by analyzing the movement patterns across sequential video frames to predict upcoming child's actions, allowing the system 100 to assess potential risks before they occur. In some embodiments, $D_3$ 214c represents the dataset for context information 152 extraction, compiled by incorporating background elements, object interactions, and environmental context to improve precision in the activity recognition and the risk assessment. In some embodiments, the categorized datasets ($D_1$ 214a, $D_2$ 214b, $D_3$ 214c) serve as a final output, forming a comprehensive data foundation that is ready for use in downstream applications, including risk assessment, real-time monitoring, and notification generation.

Figure 3:
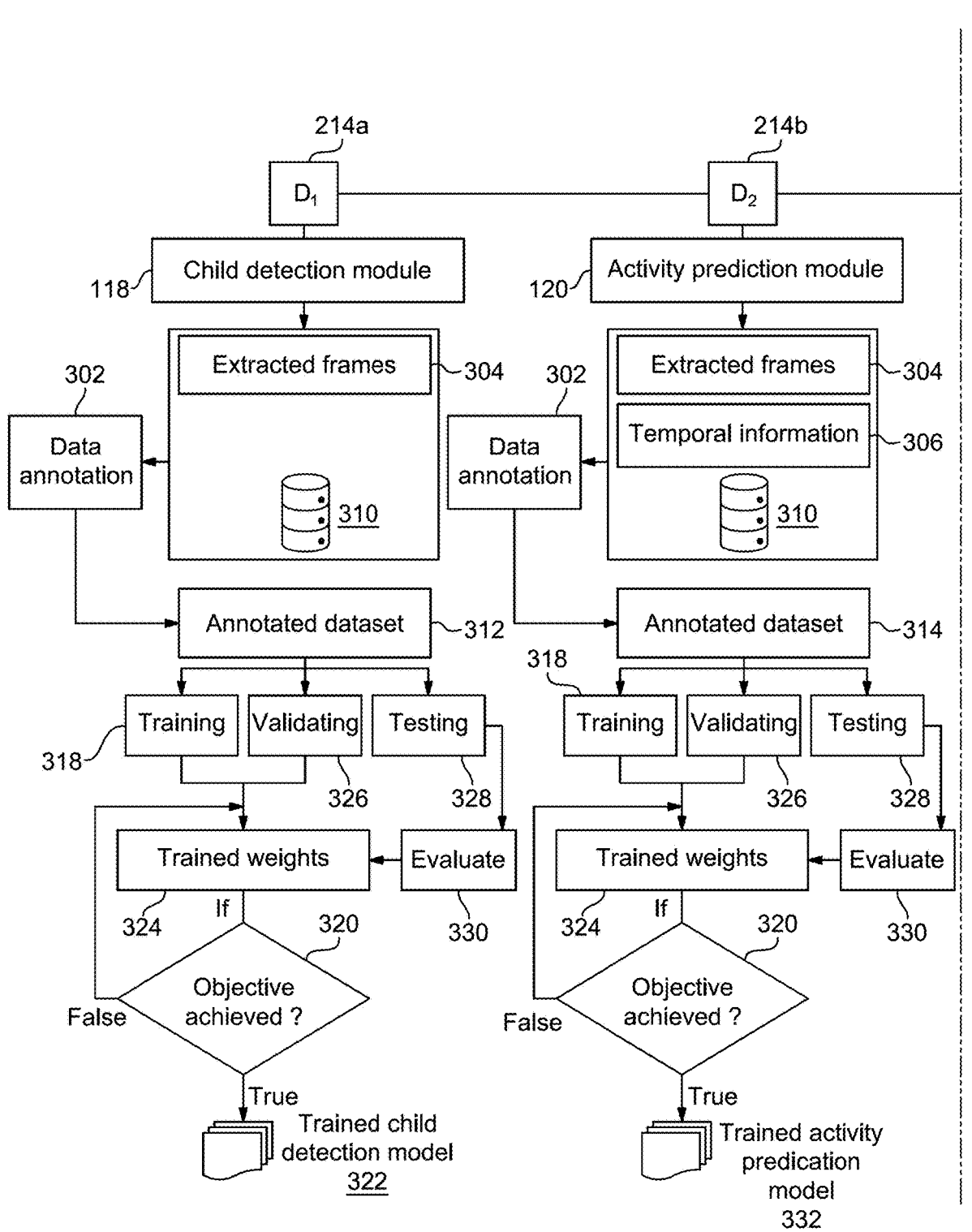
FIG. 3 illustrates a flowchart of a method for training and evaluating models of the child monitoring system, according to certain embodiments.
Figure 3:
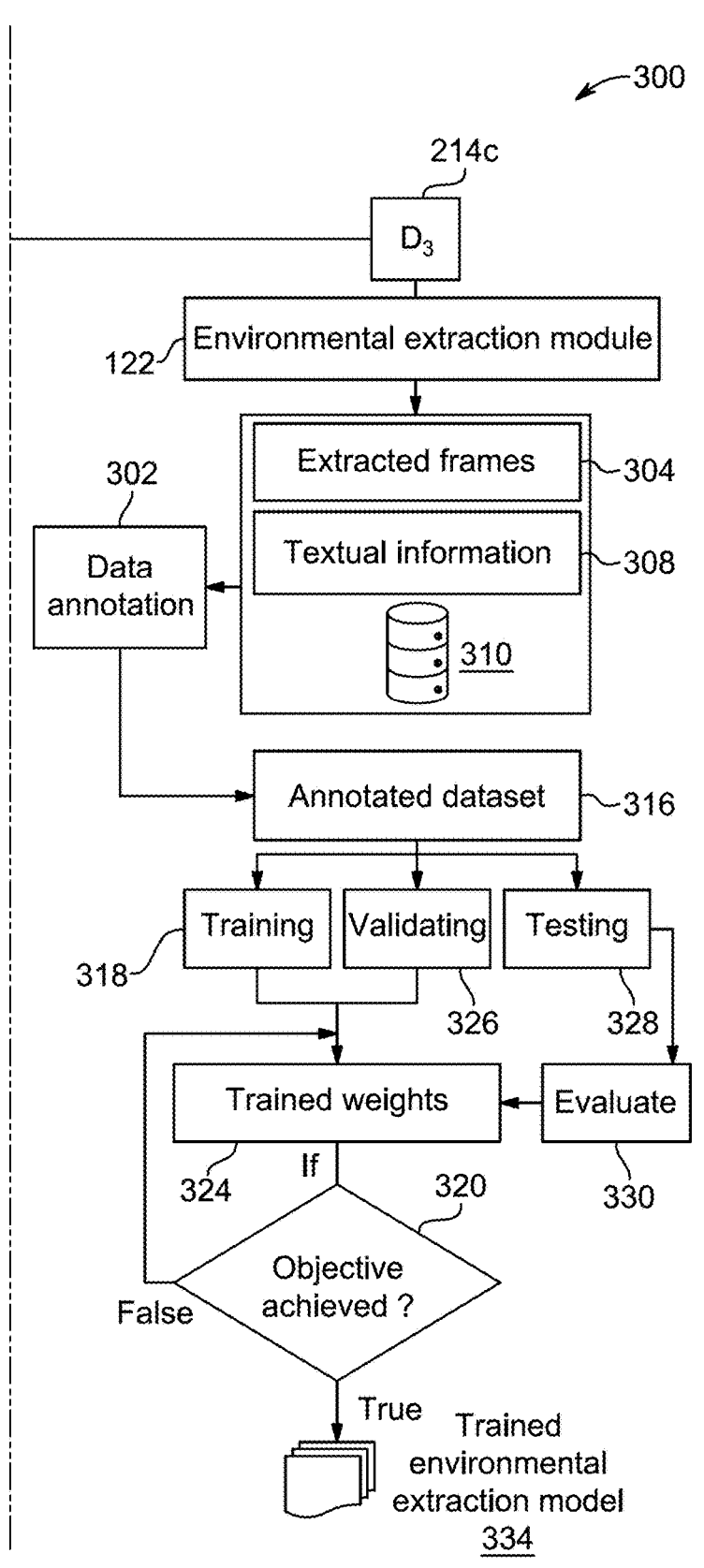

FIG. 3 illustrates a flowchart of a method 300 for training and evaluating the models of the system 100, according to certain embodiments.

At step 302, the method 300 includes annotating the data to create structured datasets $D_1$ 214a, $D_2$ 214b and $D_3$ 214c for training the models of different modules, such as the child detection module 118, the activity prediction module 120, and the environmental extraction module 122.

In some embodiments, for the child detection module 118, step 302 includes annotating frames 304 extracted from the image data and stored in a database 310. In some embodiments, the step includes annotating each extracted frame 304 by drawing the bounding boxes around the children within the frames 304. In some embodiments, each bounding box is labelled as a "child" or "not a child," which may be advantageous for ensuring that the dataset $D_1$ 214a is structured for the child detection. In some embodiments, the metadata may be linked to each annotated frame to improve the accuracy. In some embodiments, the annotated frames serve as an annotated dataset 312. The annotation process of the frames 304 has been explained in detail above in regard to FIG. 1B.

In some embodiments, for the activity prediction module 120, step 302 includes annotating the extracted frames 304 and temporal information 306 to capture the motion patterns over time. In some embodiments, the extracted frames 304 and the temporal information 306 may be stored in the database 310. The annotation may be advantageous for facilitating or enabling the activity prediction model to learn the context of the movement (e.g., whether the child is running, sitting, climbing, or interacting with the objects), ensuring that the dataset $D_2$ 214b is structured for the activity prediction. In some embodiments, the temporal information 306 may be structured into sequence-based datasets (i.e., annotated dataset 314), where each sequence contains a series of annotated frames along with the corresponding activity labels (e.g., "playing," "walking," "sitting"). The annotated dataset 314 may be advantageous for facilitating or enabling that the activity prediction model predicts imminent child's movements based on past visual sequences. The annotation process of the frames 304 and the temporal information 306 has been explained in detail above in regard to FIG. 1B.

For the environmental extraction module 122, step 302 includes integrating textual information 308 and the extracted frames 304 to enrich the semantic understanding of the environmental extraction model. In some embodiments, each frame 304 is paired with the textual information 308 for describing the scene (e.g., "child near a playground," "child crossing street") and object interactions (e.g., "holding toy," "walking with an adult"). In some embodiments, to ensure that the dataset $D_3$ 214c is structured for environmental context extraction, the annotation process systematically associates the visual elements with the textual descriptions. In some embodiments, as a result of this annotation process, the combination of the extracted frames 304 and the textual information 308 can form an annotated dataset 316, which is structured in a format that supports multi-modal learning, allowing the environmental extraction model to process both visual and textual inputs for improved context extraction. The annotation process of the frames 304 and the textual information 308 has been explained in detail above in regard to FIG. 1B.

At step 318, the method 300 includes training the models of the different modules using the corresponding annotated datasets 312, 314, 316.

For the child detection module 118, step 318 includes processing the annotated dataset 312 (including frames 304) into a format suitable for model training. In some embodiments, the processing of the annotated dataset 312 may include resizing images, normalizing pixel values, and applying augmentation techniques (e.g., flipping, rotation, brightness adjustments) to improve model robustness. In some embodiments, step 318 further includes selecting and initializing the child detection model (e.g., CNN) with either random weights or pre-trained weights from a related dataset. In some embodiments, step 318 further includes feeding the annotated dataset 312 into the child detection model and extracting features (edges, shapes, textures) from the annotated dataset 312 to detect the children within the bounding boxes. In some embodiments, step 318 further includes training the child detection model by optimizing its parameters using a loss function (e.g., intersection over union (IoU) loss for bounding box accuracy). In some embodiments, the child detection model iteratively adjusts its weights through backpropagation, using optimization algorithms, such as, but not limited to, Adam, stochastic gradient descent (SGD), and so forth, to minimize detection errors. In some embodiments, after multiple training iterations, a trained child detection model 322 is obtained, which accurately detects the children within the frames 304. In some embodiments, once training is complete, the method 300 proceeds to step 320 for checking objective criteria. In some embodiments, the objective criteria include achieving a minimum required accuracy, robustness, and generalization ability on the annotated dataset 312.

For the activity prediction module 120, step 318 includes leveraging the annotated dataset 314 that includes sequential frames 304 along with the temporal information 306. In some embodiments, the annotated dataset 314 may be advantageous for capturing the dynamics of the child's activities over time. In some embodiments, this step includes feeding the sequential frames 304 into the activity prediction model that may be designed to handle sequential data and effective in capturing temporal dependencies. In some embodiments, the activity prediction model may be trained to predict upcoming activities based on previous frames in a sequence. In some embodiments, during training, the activity prediction model learns to identify the movement patterns and temporal relationships within the annotated dataset 314, such as how a child's motion in one frame leads to specific actions in subsequent frames. In some embodiments, through repeated training cycles, a trained activity prediction model 332 is obtained, which effectively anticipates the child's movements. In some embodiments, once training is complete, the method 300 proceeds to step 320 to check the objective criteria.

For the environmental extraction module 122, step 318 includes preprocessing the annotated dataset 316, where the images are resized, normalized, and augmented using techniques such as random cropping, brightness adjustments, contrast enhancement, and horizontal flipping to improve model generalization. In some embodiments, the environmental extraction model, such as a vision-language model, an image captioning model, or a multi-modal transformer, is selected and initialized with either random weights or pre-trained embeddings from large-scale vision-language datasets (e.g., COCO). In some embodiments, the environmental extraction model processes each annotated frame by extracting spatial features using the CNNs while simultaneously encoding the textual information 308 using a language model (e.g., BERT, GPT). In some embodiments, the extracted visual and textual features are aligned using a multi-modal attention mechanism, enabling the environmental extraction model to learn the contextual relationships between the objects, actions, and environments. In some embodiments, the environmental extraction model may be trained using supervised learning with loss functions such as a contrastive loss for feature alignment or cross-entropy loss for classification tasks. In some embodiments, as a result of this training, a trained environmental extraction model 334 is obtained, capable of accurately interpreting both visual and textual data. In some embodiments, once training is complete, the method 300 proceeds to step 320, where the trained environmental extraction model 334 is evaluated based on the objective criteria.

At step 320, the method 300 includes checking if the objective criteria are met (i.e., the trained models 322, 332, 334 achieve the required accuracy and robustness on the corresponding annotated dataset 312, 314, 316). In some embodiments, this checking may be performed by comparing predictions of the respective trained models 322, 332, 334 with ground truth annotations. In some embodiments, the method 300 includes storing the trained weights 324 and stopping the training process, if the objective criteria are met. In some embodiments, if the objective criteria are not met, then the method 300 reverts to the trained weights 324 and undergoes further fine-tuning, including adjustments to hyperparameters (e.g., learning rate, batch size, dropout rates), additional data augmentation, or modifications to a model architecture. The retrained model is then re-evaluated until it meets the objective criteria.

At step 326, the method 300 includes validating the trained models 322, 332, 334 on unseen data to assess generalization and fine-tune parameters before deployment. Validation ensures that the trained models 322, 332, 334 perform well in real-world conditions, reducing risks of overfitting.

For the child detection module 118, step 326 includes validating the performance of the trained child detection model 322 on the unseen dataset (i.e., frames 304 that are not used during training) to fine-tune the trained child detection model 322 and prevent overfitting. In some embodiments, the accuracy of the trained child detection model 322 is assessed using key metrics, such as, but not limited to, precision, recall, mean average precision (mAP) (to evaluate detection accuracy), false positives and false negatives (to assess incorrect detections). In some embodiments, if validation accuracy is low or overfitting is observed, the hyperparameters may be adjusted to improve generalization. In some embodiments, the trained weights 324 may be updated accordingly, and the trained child detection model 322 is re-evaluated. In some embodiments, if a validation performance does not improve after multiple iterations, training is halted early to prevent overfitting. In some embodiments, once the trained child detection model 322 achieves optimal validation performance, the method 300 proceeds to step 320 for checking the objective criteria. In some embodiments, if the objective criteria are met, the method 300 proceeds to step 328. Otherwise, the trained child detection model 322 is fine-tuned and revalidated.

For the activity prediction module 120, step 326 includes validating the trained activity prediction model 332 using an unseen validation dataset (i.e., unseen annotated dataset) to assess its generalization and prevent overfitting. In some embodiments, the trained activity prediction model 332 is evaluated by feeding it the sequence of frames 304, allowing the trained activity prediction model 332 to predict future activity states based on learned motion representations. In some embodiments, once the trained activity prediction model 332 achieves the optimal validation performance, the method 300 proceeds to step 320 for checking the objective criteria. In some embodiments, if the objective criteria are met, the method 300 proceeds to step 328. Otherwise, the trained activity prediction model 332 is fine-tuned and revalidated.

For the environmental extraction module 122, step 326 includes validating the trained environmental extraction model 334 using an unseen validation dataset (i.e., unseen annotated dataset) to ensure its accuracy and robustness in real-world scenarios. In some embodiments, during validation, the trained environmental extraction model 334 processes the input frames 304 and generates textual predictions, which are then compared against the ground-truth annotations. In some embodiments, the validation process continues iteratively until the trained environmental extraction model 334 achieves optimal accuracy in extracting the context information 152 from diverse visual environments. In some embodiments, once the validation is complete, the method 300 proceeds to step 320 for checking the objective criteria. In some embodiments, if the criteria are met, the method 300 proceeds to step 328. Otherwise, the trained environmental extraction model 334 is fine-tuned and revalidated.

At step 328, the method 300 includes testing the trained and validated models 322, 332, 334 on a separate dataset (test dataset) that simulates real-world conditions.

For the child detection module 118, step 328 includes evaluating 330 the performance of the trained child detection model 322 on the test dataset. In some embodiments, the test dataset includes images with diverse lighting conditions (e.g., bright sunlight, low light, shadows), varying occlusions (e.g., partial visibility due to obstacles), different crowd densities, and diverse child's postures (e.g., standing, sitting, crawling, running). In some embodiments, once testing is complete, the method 300 proceeds to step 320 for checking the objective criteria. In some embodiments, if the criteria are met, then the trained child detection model 322 is finalized. Otherwise, additional fine-tuning, such as hyperparameter adjustments or additional data augmentation, may be performed on the trained child detection model 322 to improve detection performance.

For the activity prediction module 120, step 328 includes testing the trained activity prediction model 332 on the sequential frames 304 from the test dataset. In some embodiments, the test dataset includes video sequences capturing various child's activities in natural settings, including transitions between different actions such as playing, walking, running, and interacting with the objects. In some embodiments, the trained activity prediction model 332 is evaluated based on its ability to predict upcoming actions with high accuracy by assessing metrics such as a prediction accuracy, a sequence-level recall, and a temporal consistency. In some embodiments, once testing is complete, the method 300 proceeds to step 320 for checking the objective criteria. In some embodiments, if the criteria are met, then the trained activity prediction model 332 is finalized. Otherwise, the trained activity prediction model 332 undergoes further refinement, including additional training with augmented data, adjustments in temporal modeling techniques, or hyperparameter tuning.

For the environmental extraction module 122, step 328 includes assessing the trained environmental extraction model 334 using the test dataset, which contains diverse environmental contexts, the textual descriptions, and the object interactions. In some embodiments, the trained environmental extraction model 334 is tested on its ability to correctly align visual and textual features, generate accurate scene descriptions, and extract meaningful contextual information. In some embodiments, once testing is complete, the method 300 proceeds to step 320 for checking the objective criteria. In some embodiments, if the objective criteria are met, then the trained environmental extraction model 334 is finalized. Otherwise, additional fine-tuning steps, such as domain adaptation or reinforcement learning-based training, may be applied to enhance performance.

Figure 4:
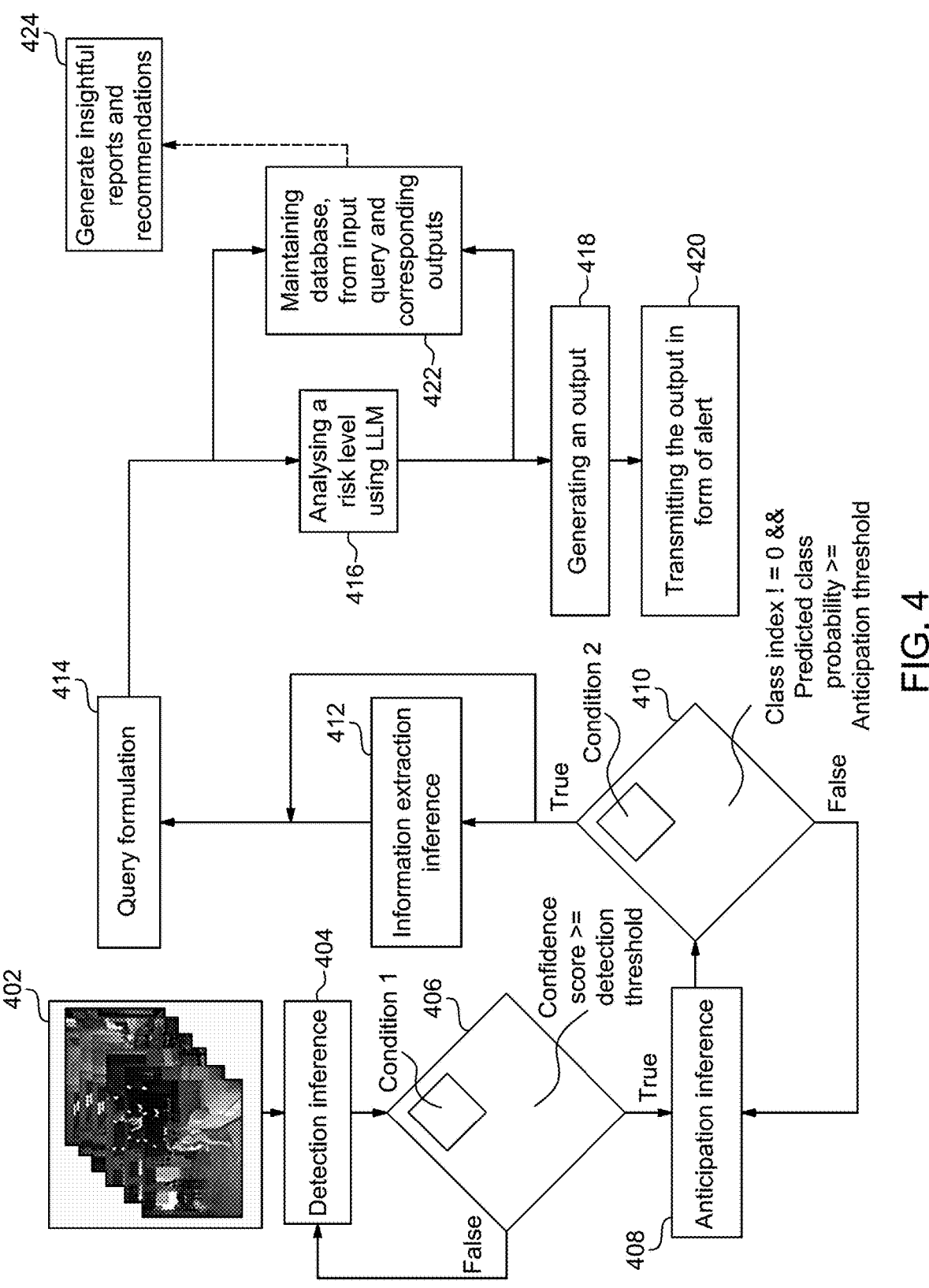
FIG. 4 illustrates a flowchart of a method for child monitoring, according to certain embodiments.

FIG. 4 illustrates a flowchart of a method 400 for child monitoring, according to certain embodiments. The method 400 includes a series of steps. These steps are only illustrative, and other alternatives may be considered where one or more steps are added, one or more steps are removed, or one or more steps are provided in a different sequence without departing from the scope of the present disclosure.

At step 402, the method 400 includes receiving the image data, by the processing circuitry 106, from the image collection unit 102. In some embodiments, the image data is the video data. In some embodiments, the method 400 includes receiving the audio data, by the processing circuitry 106.

At step 404, the method 400 includes detecting the object in the image data and determining whether the object is the child using the child detection module 118. In some embodiments, upon determining the presence of the child in the image data, this step further includes assigning the confidence score (P), which represents the likelihood that the detected object is indeed the child.

At step 406, the method 400 includes comparing the assigned confidence score (P) against the detection threshold (T) to determine the validity of the detected object as the child. In some embodiments, if the confidence score (P) is greater than or equal to the detection threshold (T), then the method 400 proceeds to step 408. In some embodiments, if the confidence score (P) is less than the detection threshold (T), then the method 400 reverts to step 404.

At step 408, the method 400 includes determining the activity in which the child is engaged, based on the image data using the activity prediction module 120. In some embodiments, the method 400 includes determining the activity in which the child is engaged, based on the image data and the audio data using the activity prediction module 120.

At step 410, the method 400 includes determining whether the determined activity 148 is valid or not. In some embodiments, if the determined activity 148 has a valid class index (C!=0) and the predicted class probability (P) meets or exceeds the anticipation threshold (AT), then the activity is considered valid, and the method 400 proceeds to step 412. In some embodiments, if the determined activity 148 has invalid class (C=0) or the predicted class probability (P) is less than the anticipation threshold (AT), then the determined activity 148 is considered as invalid, and the method 400 reverts to step 408.

At step 412, the method 400 includes extracting the context information 152 related to the environment where the child is engaging in the activity based on the image data using the environmental extraction module 122. In some embodiments, the method 400 includes extracting the context information 152 related to the environment where the child is engaging in the activity based on the image data and the audio data using the environmental extraction module 122.

At step 414, the method 400 includes formulating the query based on the output of the activity prediction module 120 (i.e., a combination of the determined activity 148 and the predicted class probability (P) 150) and the environmental extraction module 122 (the context information 152). For example, the formulated query may be "analyze the risk level of a three-year-old child in the living room jumping on the table, with the predicted class probability (P) 150.

At step 416, the method 400 includes analyzing the risk level associated with the determined activity 148 and the environment, using the LLMs 116, based on the query received from the step 414. In some embodiments, this step includes feeding the query into the LLMs 116 to receive analyzed risk level 156. In some embodiments, the analyzed risk level 156 may be the low risk 158, the moderate risk 160 or the high risk 162.

At step 418, the method 400 further includes generating an output associated with the analyzed risk level 156. In some embodiments, the output indicates the severity of the risk and the necessary actions to be taken. For example, the output may be "high risk of falling and severe injury. Immediate action needed".

At step 420, the method 400 includes transmitting the generated output in the form of an alert to the caretaker device 108. In some embodiments, the caretaker device 108 may be the smartphone. In some embodiments, the alert may be transmitted through various forms, including the phone messages 168, the email alerts 170, and the in-house alerts 172. In some embodiments, this step also includes transmitting the child alert to the child alert device 110.

At step 422, the method 400 includes maintaining the database 310 by storing data associated with the query and the corresponding output for continual learning and refinement of the system 100. In some embodiments, this step includes collecting and storing the data from multiple monitoring sessions, which include the queries formulated at step 414, the analyzed risk level 156 from step 416, and corresponding alerts from step 420. In some embodiments, the stored data serves as a historical record that enables pattern identification, trend analysis, and continuous learning to improve the accuracy and effectiveness of the system 100.

At step 424, the method 400 includes generating reports and recommendations based on the data stored in the database 310. In some embodiments, generating the reports may include aggregating relevant data points over a predefined period, such as daily, weekly, or monthly intervals. In some embodiments, the reports may include analyses such as a frequency of high-risk activities, common environmental hazards associated with specific activities, and overall risk distribution for a particular child or across multiple children in different monitored environments. In some embodiments, the reports may be formatted as visual dashboards, statistical summaries, detailed logs providing patterns in the child's behavior and risk-prone scenarios, or combinations of these. For example, the report may include that the child frequently engages in the high-risk activities, such as climbing on the furniture in the absence of supervision, prompting the caretakers to take preventive measures like securing sharp edges or restricting access to hazardous areas.

In some embodiments, generating the recommendations may include utilizing machine learning algorithms to analyze the stored data and suggest personalized safety measures. In some embodiments, the recommendations may include modifying the layout of a room to reduce the potential hazards, setting up safety barriers in specific locations, or providing educational guidance to the caretakers on minimizing the risk. In some embodiments, the recommendations may include suggesting personalized interventions based on past incidents, such as sending real-time reminders to the caretakers when the child is engaging in the activity that has previously been flagged as risky.

According to a first aspect, the present disclosure relates to a child monitoring system 100. In some embodiments, the system 100 includes processing circuitry 106 configured to receive image data. In some embodiments, the processing circuitry 106 is further configured to detect, in the image data, a presence of a child using a child detection module 118. In some embodiments, the processing circuitry 106 is further configured to determine, using an activity prediction module 120, an activity the child is engaged in based on the image data, after detecting the presence of the child. In some embodiments, the processing circuitry 106 is further configured to extract, using an environmental extraction module 122, context information 152 related to an environment where the child is engaging in the activity based on the image data after determining the activity the child is engaged in. In some embodiments, the processing circuitry 106 is further configured to determine, using a large language model 116, a risk based on the activity the child is engaged in and the context information 152, after extracting the context information 152. In some embodiments, the processing circuitry 106 is further configured to generate a caretaker alert based on the risk. In some embodiments, the processing circuitry 106 is further configured to transmit the caretaker alert to a caretaker device 108.

In some embodiments, the system 100 includes an image collection unit 102 comprising a camera 114 configured to collect image data and transmit the image data to the processing circuitry 106.

In some embodiments, the image data is video data.

In some embodiments, the caretaker device 108 is a smartphone.

In some embodiments, the processing circuitry 106 is configured to receive audio data. In some embodiments, the activity prediction module 120 determines the activity the child is engaged in based on the image data and the audio data. In some embodiments, the environmental extraction module 122 extracts the context information 152 related to the environment where the child is engaging in the activity based on the image data and the audio data.

In some embodiments, the system 100 includes a child alert device 110. The processing circuitry 106 is further configured to transmit to the child alert device 110 a child alert.

In some embodiments, the child alert includes verbal instruction to the child.

The present disclosure also relates to a method 400 for child monitoring. In some embodiments, the method 400 includes receiving image data. In some embodiments, the method 400 further includes detecting, in the image data, a presence of a child using a child detection module 118. In some embodiments, the method 400 further includes, after detecting the presence of the child, determining, using an activity prediction module 120, an activity the child is engaged in based on the image data. In some embodiments, the method 400 includes after the determining the activity the child is engaged in, extracting, using an environmental extraction module 122, context information 152 related to an environment where the child is engaging in the activity based on the image data. In some embodiments, the method 400 includes after the extracting the context information 152, determining, using a large language model 116, a risk based on the activity the child is engaged in and the context information 152. In some embodiments, the method 400 further includes based on the risk, generating a caretaker alert. In some embodiments, the method 400 further includes transmitting the caretaker alert to a caretaker device 108.

In some embodiments, the method 400 includes collecting image data using an image collection unit 102 comprising a camera 114.

In some embodiments, the image data is video data.

In some embodiments, the caretaker device 108 is a smartphone.

In some embodiments, the method 400 includes receiving audio data. In some embodiments, the method 400 includes the determining the activity the child is engaged in, based on the image data and the audio data. In some embodiments, the method 400 includes the extracting the context information 152 related to the environment where the child is engaging in the activity, based on the image data and the audio data.

In some embodiments, the method 400 includes transmitting to a child alert device 110 a child alert.

In some embodiments, the child alert includes a verbal instruction to the child.

The present disclosure also relates to a non-transitory computer-readable medium having stored thereon, computer executable instructions, which when executed by a computer, cause the computer to execute operations. In some embodiments, the operations include receiving image data. In some embodiments, the operations further include detecting, in the image data, a presence of a child using a child detection module 118. In some embodiments, the operations further include after detecting the presence of the child, determining, using an activity prediction module 120, an activity the child is engaged in based on the image data. In some embodiments, the operations further include after the determining the activity the child is engaged in, extracting, using an environmental extraction module 122, context information 152 related to an environment where the child is engaging in the activity based on the image data. In some embodiments, the operations further include after the extracting the context information 152, determining, using a large language model 116, a risk based on the activity the child is engaged in and the context information 152. In some embodiments, the operations further include based on the risk, generating a caretaker alert. In some embodiments, the operations further include transmitting the caretaker alert to a caretaker device 108.

In some embodiments, the operations include collecting image data using an image collection unit 102 comprising a camera 114.

In some embodiments, the image data is video data.

In some embodiments, the caretaker device 108 is a smartphone.

In some embodiments, the operations include receiving audio data. In some embodiments, the operations include the determining the activity the child is engaged in, based on the image data and the audio data. In some embodiments, the operations include the extracting the context information 152 related to the environment where the child is engaging in the activity, based on the image data and the audio data.

In some embodiments, the operations include transmitting to a child alert device 110 a child alert. In some embodiments, the child alert includes a verbal instruction to the child.

Figure 5:
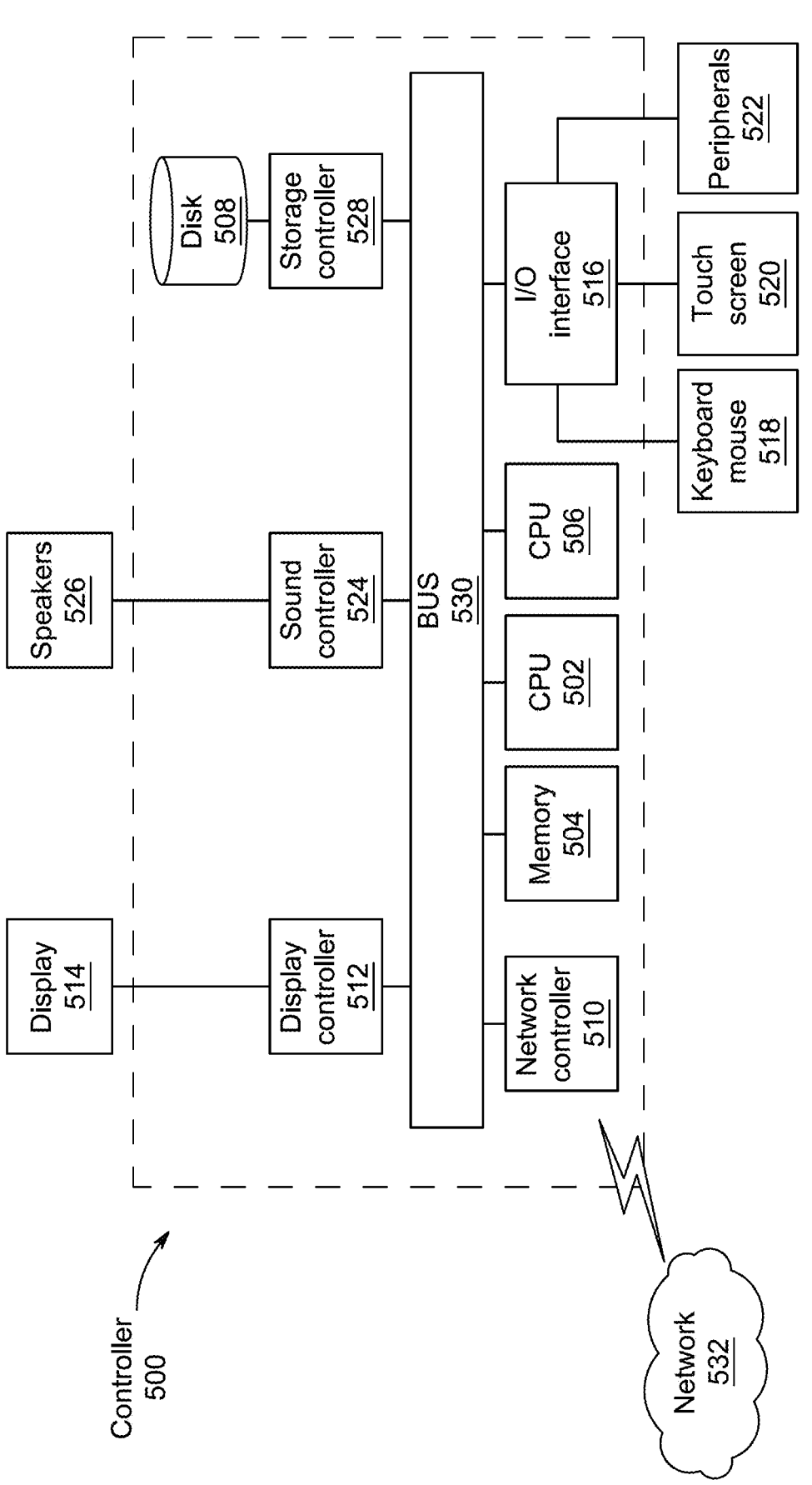
FIG. 5 is an illustration of a non-limiting example of details of computing hardware used in a computing system, according to certain embodiments.

Next, further details of the hardware description of the computing environment according to exemplary embodiments are described with reference to FIG. 5. In FIG. 5, a controller 500 is described as representative of the processing circuitry 106 of the system 100 of FIG. 1A in which the controller 500 is the processing circuitry 106 which includes a CPU 502 which performs the processes described above/below. The process data and instructions may be stored in memory 504. These processes and instructions may also be stored on a storage medium disk 508 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 502, 506 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 502 or CPU 506 may be a INTEL® XEON® or CORE™ processor, an AMD® EPYC® or RYZEN™ processor, an APPLE® M1, M2, M3, or M4 processor, or may be other processor types that would be recognized by one of ordinary skill in the art. Alternatively, the CPU 502, 506 may be implemented on an FPGA, ASIC, PLD or using discrete logic circuits, as one of ordinary skill in the art would recognize. Further, CPU 502, 506 may be implemented as multiple processors cooperatively working in parallel to perform the instructions of the inventive processes described above.

The computing device in FIG. 5 also includes a network controller 510, such as an Intel Ethernet PRO network interface card from Intel Corporation of America, for interfacing with network 532. As can be appreciated, the network 532 can be a public network, such as the Internet, or a private network such as an LAN or WAN network, or any combination thereof and can also include PSTN or ISDN subnetworks. The network 532 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 512, such as a NVIDIA GeForce GTX or Quadro graphics adaptor from NVIDIA Corporation of America for interfacing with display 514, such as a LED or LCD monitor. A general purpose I/O interface 516 interfaces with a keyboard and/or mouse 518 as well as a touch screen panel 520 on or separate from display 514. General purpose I/O interface also connects to a variety of peripherals 514 including devices such as wired connections to various components of the system described above, printers, and scanners.

A sound controller 524 is also provided in the computing device such as Sound Blaster X-Fi Titanium from Creative, to interface with speakers/microphone 526 thereby providing sounds and/or music.

The general purpose storage controller 528 connects the storage medium disk 508 with communication bus 530, which may be an ISA, EISA, VESA, PCI, or similar, for interconnecting all of the components of the computing device. A description of the general features and functionality of the display 514, keyboard and/or mouse 518, as well as the display controller 512, storage controller 528, network controller 510, sound controller 524, and general purpose I/O interface 516 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
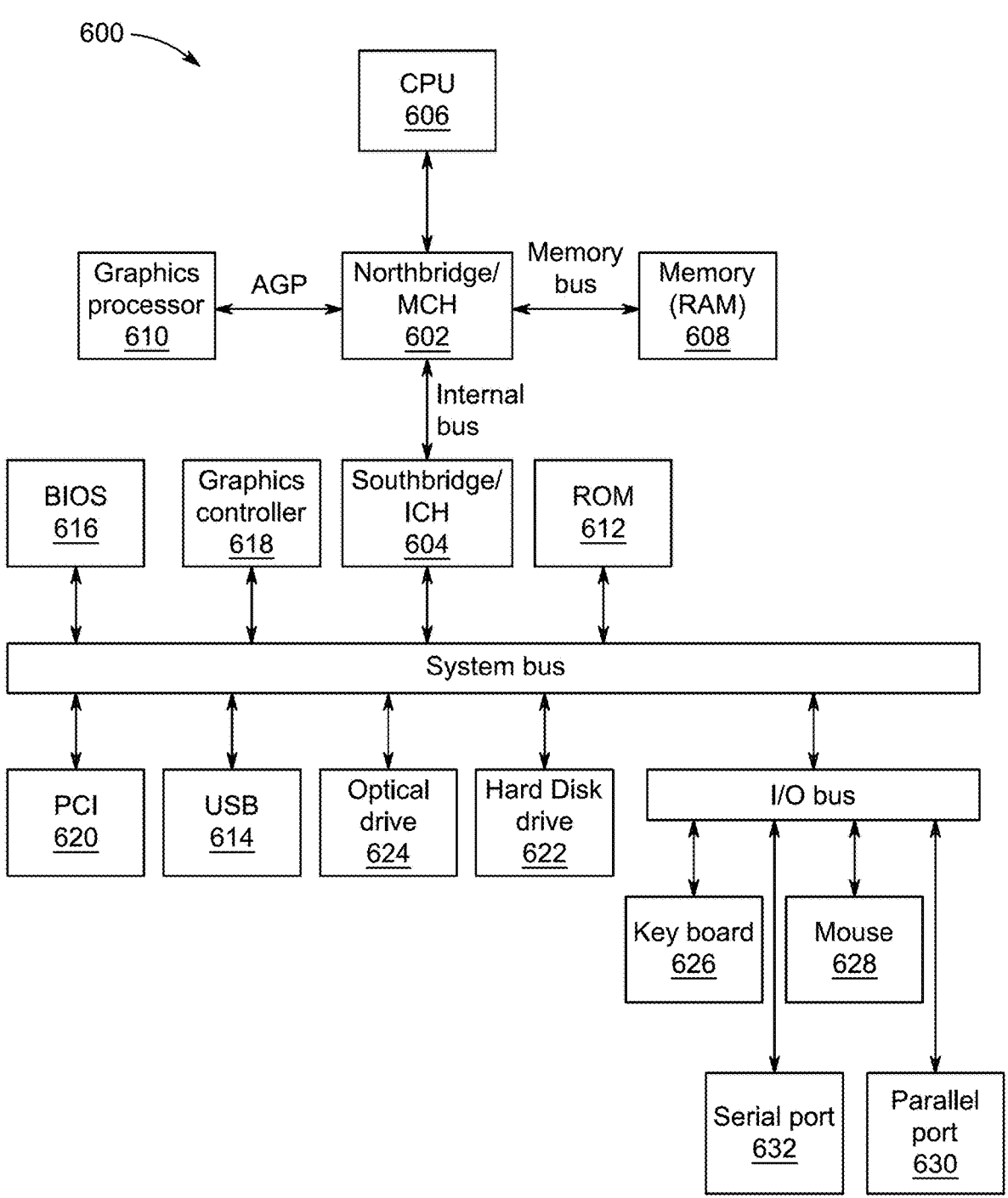
FIG. 6 is an exemplary schematic diagram of a data processing system used within the computing system, according to certain embodiments.

FIG. 6 shows a schematic diagram of a data processing system 600, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 602 and a south bridge and input/output (I/O) controller hub (SB/ICH) 604. The central processing unit (CPU) 606 is connected to NB/MCH 602. The NB/MCH 602 also connects to the memory 608 via a memory bus, and connects to the graphics processor 610 via an accelerated graphics port (AGP). The NB/MCH 602 also connects to the SB/ICH 604 via an internal bus (e.g., a unified media interface or a direct media interface). The CPU Processing unit 606 may contain one or more processors and even may be implemented using one or more heterogeneous processor systems.

Figure 7:
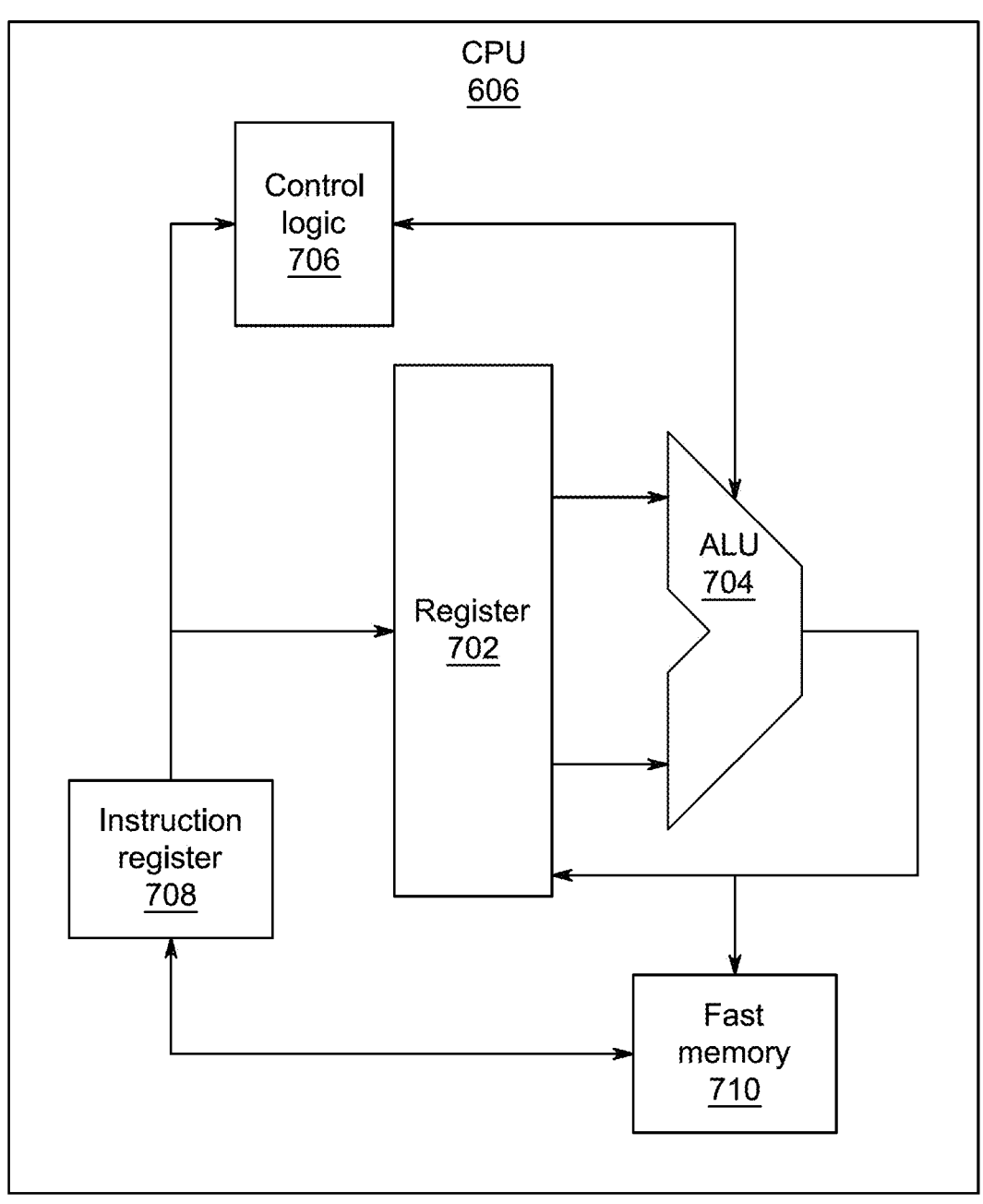
FIG. 7 is an exemplary schematic diagram of a processor used with the computing system, according to certain embodiments.

For example, FIG. 7 shows one implementation of CPU 606. In one implementation, the instruction register 708 retrieves instructions from the fast memory 710. At least part of these instructions is fetched from the instruction register 708 by the control logic 706 and interpreted according to the instruction set architecture of the CPU 606. Part of the instructions can also be directed to the register 702. In some implementations the instructions are decoded according to a hardwired method, and in some implementations the instructions are decoded according to a microprogram that translates instructions into sets of CPU configuration signals that are applied sequentially over multiple clock pulses. After fetching and decoding the instructions, the instructions are executed using the arithmetic logic unit (ALU) 704 that loads values from the register 702 and performs logical and mathematical operations on the loaded values according to the instructions. The results from these operations can be feedback into the register and/or stored in the fast memory 710. According to certain implementations, the instruction set architecture of the CPU 606 can use a reduced instruction set architecture, a complex instruction set architecture, a vector processor architecture, a very large instruction word architecture. Furthermore, the CPU 606 can be based on the Von Neuman model or the Harvard model. The CPU 606 can be a digital signal processor, an FPGA, an ASIC, a PLA, a PLD, or a CPLD. Further, the CPU 606 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 604 is coupled through a system bus to an I/O Bus, a read only memory (ROM) 612, universal serial bus (USB) port 614, a flash binary input/output system (BIOS) 616, and a graphics controller 618. PCI/PCIe devices can also be coupled to SB/ICH 604 through a PCI bus 620.

The PCI devices may include, for example, Ethernet adapters, add-in cards, and PC cards for notebook computers. The Hard disk drive 622 and optical drive 624 can use, for example, an integrated drive electronics (IDE) or serial advanced technology attachment (SATA) interface. In one implementation the I/O bus can include a super I/O (SIO) device.

Further, the hard disk drive (HDD) 622 and optical drive 624 can also be coupled to the SB/ICH 604 through a system bus. In one implementation, a keyboard 626, a mouse 628, a parallel port 630, and a serial port 632 can be connected to the system bus through the I/O bus. Other peripherals and devices that can be connected to the SB/ICH 604 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 8:
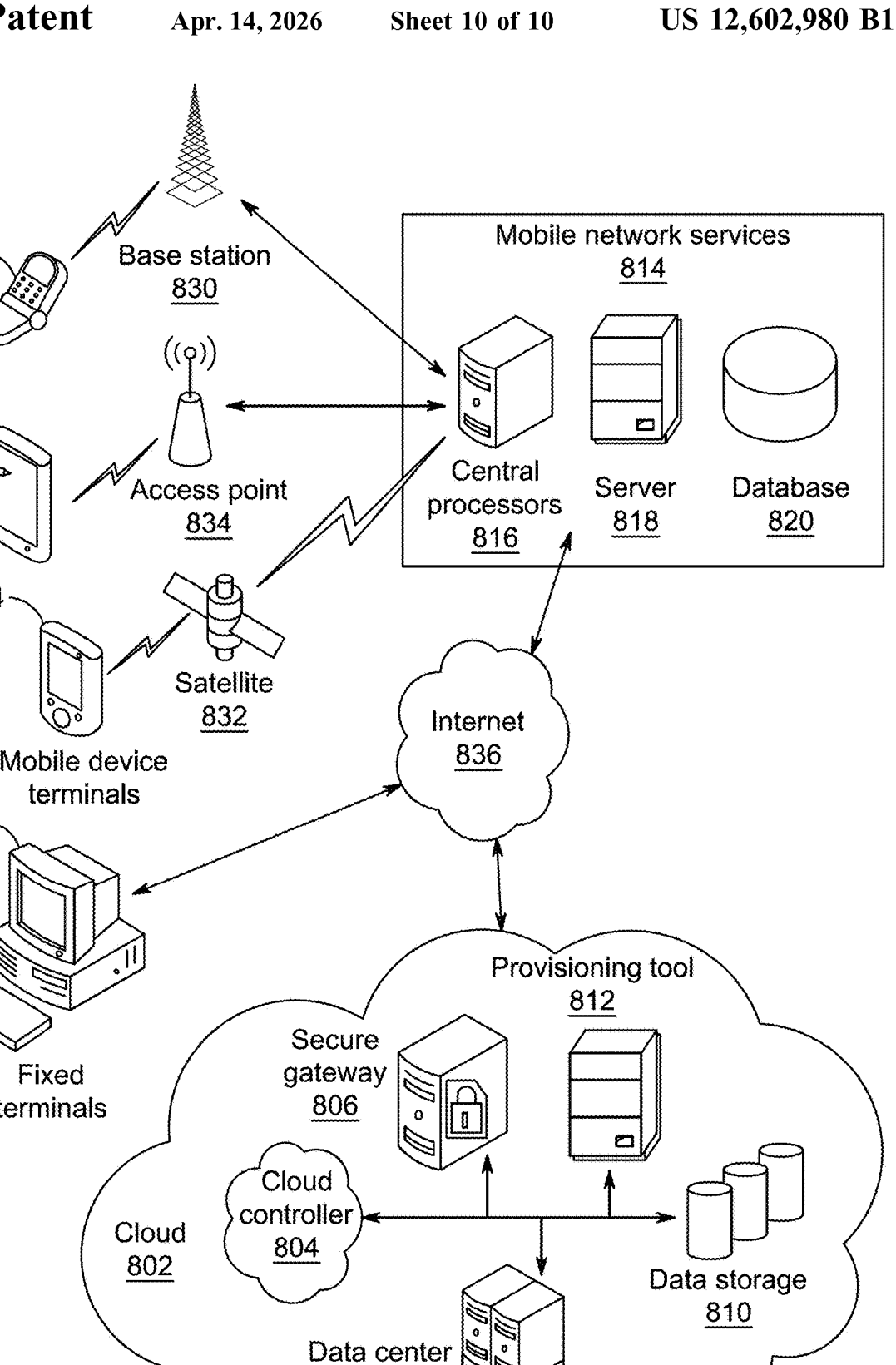
FIG. 8 is an illustration of a non-limiting example of distributed components which may share processing with a controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 802 including a cloud controller 804, a secure gateway 806, a data center 808, data storage 810 and a provisioning tool 812, and mobile network services 814 including central processors 816, a server 818 and a database 820, which may share processing, as shown by FIG. 8, in addition to various human interface and communication devices (e.g., display monitors 822, smart phones 828, tablets 826, personal digital assistants (PDAs) 824). The network may be a private network, such as a LAN, satellite 832 or WAN 834, or be a public network 830, may such as the Internet 836. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A child monitoring system, comprising
processing circuitry configured to:
    receive image data,
    detect, in the image data, a presence of a child using a child detection module,
    after detecting the presence of the child, determine, using an activity prediction module, an activity the child is engaged in based on the image data,
    after the determining the activity the child is engaged in, extracting, using an environmental extraction module, context information related to an environment where the child is engaging in the activity based on the image data, the context information including a set of environmental, situational, and behavioral information that represents a scenario in which the activity is occurring,
    after the extracting the context information, integrate the activity and the context information to generate a structured query,
    input the structured query into a pretrained large language model, to obtain a risk assessment for the activity, the risk assessment representing a risk level for the child to perform the activity in the scenario represented by the context information,
    based on the risk assessment for the activity, generate a caretaker alert, and
    transmit the caretaker alert to a caretaker device.

2. The child monitoring system of claim 1, further comprising
an image collection unit comprising a camera configured to collect image data and transmit the image data to the processing circuitry.

3. The child monitoring system of claim 1, wherein the image data is video data.

4. The child monitoring system of claim 1, wherein the caretaker device is a smartphone.

5. The child monitoring system of claim 1, wherein the processing circuitry is further configured to:
    receive audio data, wherein the activity prediction module determines the activity the child is engaged in based on the image data and the audio data; and
    the environmental extraction module extracts the context information related to the environment where the child is engaging in the activity based on the image data and the audio data.

6. The child monitoring system of claim 1, further comprising a child alert device, wherein the processing circuitry is further configured to transmit to the child alert device a child alert.

7. The child monitoring system of claim 6, wherein the child alert includes a verbal instruction to the child.

8. A method, comprising
receiving image data,
detecting, in the image data, a presence of a child using a child detection module,
after detecting the presence of the child, determining, using an activity prediction module, an activity the child is engaged in based on the image data,
after the determining the activity the child is engaged in, extracting, using an environmental extraction module, context information related to an environment where the child is engaging in the activity based on the image data, the context information including a set of environmental, situational, and behavioral information that represents a scenario in which the activity is occurring,
after the extracting the context information, integrating the activity and the context information to generate a structured query,
inputting the structured query into a pretrained large language model, to obtain a risk assessment for the activity, the risk assessment representing a risk level for the child to perform the activity in the scenario represented by the context information,
based on the risk assessment for the activity, generating a caretaker alert, and
transmitting the caretaker alert to a caretaker device.

9. The method of claim 8, further comprising
collecting image data using an image collection unit comprising a camera.

10. The method of claim 8, wherein the image data is video data.

11. The method of claim 8, wherein the caretaker device is a smartphone.

12. The method of claim 8, further comprising
receiving audio data, wherein
the determining the activity the child is engaged in is based on the image data and the audio data; and
the extracting the context information related to the environment where the child is engaging in the activity is based on the image data and the audio data.

13. The method of claim 8, further comprising
transmitting to a child alert device a child alert.

14. The method of claim 13, wherein the child alert includes a verbal instruction to the child.

15. A non-transitory computer-readable medium having stored thereon, computer executable instructions, which when executed by a computer, cause the computer to execute operations, the operations comprising:
    receiving image data,
    detecting, in the image data, a presence of a child using a child detection module,
    after detecting the presence of the child, determining, using an activity prediction module, an activity the child is engaged in based on the image data, after the determining the activity the child is engaged in, extracting, using an environmental extraction module, context information related to an environment where the child is engaging in the activity based on the image data, the context information including a set of environmental, situational, and behavioral information that represents a scenario in which the activity is occurring, after the extracting the context information, integrating the activity and the context information to generate a structured query, inputting the structured query into a pretrained large language model, to obtain a risk assessment for the activity, the risk assessment representing a risk level for the child to perform the activity in the scenario represented by the context information, based on the risk assessment for the activity, generating a caretaker alert, and transmitting the caretaker alert to a caretaker device.

16. The non-transitory computer-readable medium of claim 15, wherein the operations further comprise collecting image data using an image collection unit comprising a camera.

17. The non-transitory computer-readable medium of claim 15, wherein the image data is video data.

18. The non-transitory computer-readable medium of claim 15, wherein the caretaker device is a smartphone.

19. The non-transitory computer-readable medium of claim 15, wherein the operations further comprise receiving audio data, wherein the determining the activity the child is engaged in is based on the image data and the audio data; and the extracting the context information related to the environment where the child is engaging in the activity is based on the image data and the audio data.

20. The non-transitory computer-readable medium of claim 15, wherein the operations further comprise transmitting to a child alert device a child alert, wherein the child alert includes a verbal instruction to the child.

\*    \*    \*    \*    \*